(12) United States Patent
Reichbauer et al.

(10) Patent No.: US 12,741,876 B2
(45) Date of Patent: Sep. 22, 2026

(54) METHOD AND DEVICE FOR PRODUCING CARBON MONOXIDE FROM CARBON DIOXIDE

(71) Applicant: Siemens Energy Global GmbH & Co. KG, Munich (DE)

(72) Inventors: Thomas Reichbauer, Allershausen (DE); Günter Schmid, Hemhofen (DE); Andre Klinger, Nuremberg (DE); Yashar Musayev, Nuremberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 888 days.

(21) Appl. No.: 18/012,396

(22) PCT Filed: May 5, 2021

(86) PCT No.: PCT/EP2021/061823

§ 371 (c)(1),
(2) Date: Dec. 22, 2022

(87) PCT Pub. No.: WO2022/008117

PCT Pub. Date: Jan. 13, 2022

(65) Prior Publication Data

US 2023/0278875 A1 Sep. 7, 2023

(30) Foreign Application Priority Data

Jul. 9, 2020 (DE) ..................... 10 2020 208 634.6
Sep. 24, 2020 (DE) ..................... 10 2020 212 022.6

(51) Int. Cl.
*C01B 32/40* (2017.01)
*B01J 10/00* (2006.01)

(52) U.S. Cl.
CPC ............... *C01B 32/40* (2017.08); *B01J 10/00* (2013.01)

(58) Field of Classification Search
CPC .......... C01B 32/40; B01J 10/00; Y02E 60/36; Y02P 20/133
See application file for complete search history.

(56) References Cited

U.S. PATENT DOCUMENTS 1,582,675 A 4/1926 Reinhold
8,562,811 B2 10/2013 Sivasankar
(Continued)

FOREIGN PATENT DOCUMENTS

EP 0597151 A1 5/1994
WO 2008143940 A2 11/2008
(Continued)

OTHER PUBLICATIONS

Shakerian et al. "A comparative review between amines and ammonia as sorptive media for post-combustion CO2 capture", Applied Energy 148 (2015) 10-22 (Year: 2015).*
(Continued)

*Primary Examiner* — Anthony J Zimmer
*Assistant Examiner* — Syed T Iqbal
(74) *Attorney, Agent, or Firm* — Wolter Van Dyke Davis, PLLC

(57) ABSTRACT

A method and a device for producing CO from $CO_2$, wherein the reaction proceeds via a formate of the formula $HNR_1R_2H^+\ HCO_2^-$ and/or an amide of the formula $HCONR_1R_2$, $R_1$ and $R_2$ being the same or different and being selected from hydrogen and substituted and unsubstituted alkyl groups having 1 to 20 C atoms.

14 Claims, 15 Drawing Sheets

(56) References Cited

U.S. PATENT DOCUMENTS

| | | | |
|---|---|---|---|
| 9,181,625 | B2 | 11/2015 | Masel |
| 9,555,367 | B2 | 1/2017 | Masel |
| 2016/0199810 | A1 | 7/2016 | Goeppert |
| 2019/0352240 | A1 | 11/2019 | Jo |

FOREIGN PATENT DOCUMENTS

| | | | |
|---|---|---|---|
| WO | 2014198859 | A1 | 12/2014 |
| WO | 2019070526 | A1 | 4/2019 |

OTHER PUBLICATIONS

Jens, Christian M. et al: "CO from CO2 and fluctuating renewable energy via formic-acid derivatives"; Green Chemistry; vol. 18, No. 20, Jan. 1, 2016 (Jan. 1, 2016), pp. 5621-5629, XP055833053.

Formamid. (Nov. 1, 2022). In Wikipedia. https://en.wikipedia.org/wiki/Formamid.

Wiener et al.; "The Heterogeneous Catalytic Hydrogenation of Bicarbonate to Formate in Aqueous Solutions"; Journal of Catalysis 110.1, 184-190; 1988.

Klankermayer, Jürgen et al: "Selektive katalytische Synthesen mit Kohlendioxid und Wasserstoff: Katalyse-Schach an der Nahtstelle zwischen Energie und Chemie"; "Selective catalytic syntheses with carbon dioxide and hydrogen: Catalytic chess at the interface between energy and chemistry" Angewandte Chemie; Applied Chemistry, vol. 128, No. 26, Jun. 20, 2016 (Jun. 20, 2016), pp. 7416-7467, XP055833050.

Su, Ji, et al. "Highly efficient hydrogen storage system based on ammonium bicarbonate/formate redox equilibrium over palladium nanocatalysts." ChemSusChem 8.5 (2015): 813-816.

Zapp, Karl-Heinz, et al. "Ammonium compounds." Ullmann's encyclopedia of industrial chemistry (2000).

Schalenbach, Maximilian, et al. "Acidic or alkaline? Towards a new perspective on the efficiency of water electrolysis." Journal of The Electrochemical Society 163.11 (2016): F3197.

Sawant, Dinesh N., et al. "Palladium-catalyzed carbon-monoxide-free aminocarbonylation of aryl halides using N-substituted formamides as an amide source." The Journal of Organic Chemistry 76.13 (2011): 5489-5494.

Wan, Y. Q., et al. "Formamide as a combined ammonia synthon and carbon monoxide source in fast palladium-catalyzed aminocarbonylations of aryl halides." Journal of combinatorial chemistry 5.2 (2003): 82-84.

Liu, Zengcai, et al. "CO2 electrolysis to CO and O2 at high selectivity, stability and efficiency using sustainion membranes." Journal of The Electrochemical Society 165.15 (2018): J3371-J3377.

Schwab, Georg-Maria. "Über den Zerfall von Formamid." Zeitschrift für anorganische Chemie, "On the decomposition of formamide." Journal of Inorganic Chemistry 262.1-5 (1950): 41-48.

Shakerian, Farid, et al. "A comparative review between amines and ammonia as sorptive media for post-combustion CO2 capture." Applied Energy 148 (2015): 10-22.

PCT International Search Report and Written Opinion of International Searching Authority mailed Jan. 13, 2022 corresponding to PCT International Application No. PCT/EP2021 /061823 filed May 5, 2021.

* cited by examiner $CO_2$
$H_2O$
$HNR_1R_2 + CO_2 + H_2O \rightarrow HNR_1R_2H^+ + HCO_3^-$
1
2
8
$H_2O \rightarrow H_2 + 1/2\ O_2$
$HNR_1R_2H^+ + HCO_3^- + H_2 \rightarrow HNR_1R_2H^+ + HCO_2^- + H_2O$
9
$HNR_1R_2$
3
$HNR_1R_2H^+ + HCO_2^- \rightarrow HCONR_1R_2 + H_2O$
4
$HCONR_1R_2 \rightarrow CO + HNR_1R_2$
CO A
B
S
$CO_2$
$H_2O$
$HNR_1R_2 + CO_2 + H_2O \rightarrow HNR_1R_2H^+ + HCO_3^-$
1
$HNR_1R_2H^+ + HCO_3^- + H_2 \rightarrow HNR_1R_2H^+ + HCO_2^- + H_2O$
2
$HNR_1R_2H^+ + HCO_2^- \rightarrow HCONR_1R_2 + H_2O$
3
$H_2O \rightarrow H_2 + 1/2\ O_2$
8
S1
9
$HNR_1R_2$
3a
$HCONR_1R_2$
S23
$HCONR_1R_2 \rightarrow CO + HNR_1R_2$
4
CO
10

19
CO
120
100
SPLIT1
105a1
14
104b
119b
104a
13
119a
103c
103a
HR1
103b
12
117a
117b
17
105b1
102e
C1
H2-2
C2
105a2
105a3
HR2
102c
102d
H2-1
16b
C4
102b
P
D
106b
MIX1
102a
16a
R1
117c
C3
115
11
106a
15
121
101
SPLITCO2
E
105b2
CO2-15
NH3
H2O
CO2
H2
R2
18

11a

11b

101

102

METHOD AND DEVICE FOR PRODUCING CARBON MONOXIDE FROM CARBON DIOXIDE

CROSS REFERENCE TO RELATED APPLICATIONS

This application is the US National Stage of International Application No. PCT/EP2021/061823 filed 5 May 2021, and claims the benefit thereof. The International Application claims the benefit of German Application No. DE 10 2020 208 634.6 filed 9 Jul. 2020 and German Application No. DE 10 2020 212 022.6 filed 24 Sep. 2020. All of the applications are incorporated by reference herein in their entirety.

FIELD OF INVENTION

The present invention relates to a process and to an apparatus for production of CO from $CO_2$, in which the reaction proceeds via a formate of the formula $HNR_1R_2H^+$ $HCO_2^-$ and/or an amide of the formula $HCONR_1R_2$, where $R_1$ and $R_2$ at the same or different and are selected from hydrogen and substituted and unsubstituted alkyl radicals having 1 to 20 carbon atoms.

BACKGROUND OF INVENTION

The prior art described herein is based on the knowledge of the inventors and does not necessarily constitute the prior art known from the literature, and so, in the description of the prior art that follows, there may not only be passages which can be found in the literature cited, but also passages which are based on further developments by the inventors and hence do not automatically constitute general prior art.

The combustion of fossil fuels currently covers about 80% of global energy demand. These combustion processes emitted about 34 032.7 million metric tons of carbon dioxide ($CO_2$) globally into the atmosphere in 2011. This release is the simplest way of disposing of large volumes of $CO_2$ as well (brown coal power plants exceeding 50 000 t per day).

Discussion about the adverse effects of the greenhouse gas $CO_2$ on the climate has led to consideration of reutilization of $CO_2$. In thermodynamic terms, $CO_2$ is at a very low level and can therefore be reduced again to usable products only with difficulty. However, attempts are being made to electrochemically reduce $CO_2$ in electrolyzers and hence to produce and provide chemical substances of value, and simultaneously to reduce the level of $CO_2$ present.

In nature, $CO_2$ is converted to carbohydrates by photosynthesis. This process, which is divided up into many component steps over time and spatially at the molecular level, is copiable on the industrial scale only with great difficulty. The more efficient route at present compared to pure photocatalysis is the electrochemical reduction of the $CO_2$. A mixed form is light-assisted electrolysis or electrically assisted photocatalysis. The two terms can be used synonymously, according to the viewpoint of the observer.

There is currently discussion of some possible routes for production of energy carriers and chemical commodities on the basis of renewable energies. A particularly worthy aim is the direct electrochemical or photochemical conversion of $CO_2$ to hydrocarbons or oxygen derivatives thereof.

However, it has been found to be difficult to find industrially suitable catalysts for production of the hydrocarbons or oxygenates for these direct routes. Therefore, there is also discussion of multistage routes, which raise the prospect of a timely solution by virtue of higher level of industrial maturity of the individual steps.

The most important intermediate in these multistage value creation chains is CO. It is generally considered to be the most important C1 unit in synthetic chemistry. In the form of a synthesis gas mixture ($H_2$/CO>2/1) with hydrogen, it can be used via the Fischer-Tropsch process for formation of hydrocarbons and for methanol synthesis. CO-richer gas mixtures or pure CO are also required for carbonylation reactions such as hydroformylation or carboxylic acid synthesis (alcohol carbonylation), in which the primary unsaturated carbon chain is extended.

Thus, if there are ways of producing CO from $CO_2$ with involvement of renewable energy sources, this opens up a multitude of ways of partly or fully replacing fossil fuels as carbon source in many chemical processes.

One possible route is the electrochemical decomposition of $CO_2$ to CO and $O_2$. This is a one-stage process. To implement this on an industrial scale is a challenge, since there is both still a lack of optimization in some of the materials utilized (e.g. anion-conducting membranes) for $CO_2$ electrolysis and a need for further research in respect of electrodes, e.g. gas diffusion electrodes.

To date, crude oil or coal is the most important industrial carbon source in terms of volume. In order to convert oxidized carbon, usually $CO_2$, or carbonate to a reduced form, energy is required. For industrial utilization, only carbon in reduced form is of interest as a substitute for fossil sources.

Although there are attempts to convert $CO_2$ electrochemically to formate/CO or hydrocarbons, these processes have to date been developed typically on a laboratory scale. Moreover, the energy efficiency of such systems is generally not very high (<=50%), as described in Liu et al.; (2018), "$CO_2$ Electrolysis to CO and $O_2$ at High Selectivity, Stability and Efficiency Using Sustainion Membranes"; Journal of Electrochemical Society, 165 (15) J3371-J3377 (2018), or else disclosed in U.S. Pat. Nos. 9,181,625 B2, 9,555,367 B2, 8,562,811 B2.

Therefore, an alternative way of producing, storing and transporting CO from $CO_2$ is to be indicated, which is implementable on an industrial scale and is scalable.

SUMMARY OF INVENTION

In this context, the inventors have found the concept for obtaining CO from $CO_2$ via intermediate storage in a compound from which CO can be released in a simple manner at a desired location and used further with sufficient purity. The present invention provide an alternative process—by comparison with $CO_2$ electrolysis—for conversion of $CO_2$ to carbon monoxide (CO), which is also scalable in terms of volume and hence is industrially suitable.

In a first aspect, the present invention relates to a process for preparing CO from $CO_2$, comprising a) reacting $CO_2$ with water and an amine of the formula $HNR_1R_2$ where $R_1$ and $R_2$ are the same or different and are selected from hydrogen and substituted and unsubstituted alkyl radicals having 1 to 20 carbon atoms to give a hydrogencarbonate of the formula $HNR_1R_2H^+$ $HCO_3^-$;

b) reacting the hydrogencarbonate of the formula $HNR_1R_2H^+$ $HCO_3^-$ with hydrogen to give a formate of the formula $HNR_1R_2H^+$ $HCO_2^-$;

c) decomposing the formate of the formula $HNR_1R_2H^+$ $HCO_2^-$ to give an amide of the formula $HCONR_1R_2$ and $H_2O$;

d) decomposing the amide of the formula $HCONR_1R_2$ to give CO and an amine of the formula $HNR_1R_2$, giving rise to a mixture comprising the need of the formula $HNR_1R_2$ and CO; and e) at least partly reacting the amine of the formula $HNR_1R_2$ in the mixture comprising the amine of the formula $HNR_1R_2$ and CO with a precipitation reagent, preferably with $CO_2$, for production of a mixture comprising CO and a precipitation product of the reaction of the amine of the formula $HNR_1R_2$ with the precipitation reagent, with or without unreacted amine of the formula $HNR_1R_2$, preferably a mixture comprising CO and a hydrogencarbonate of the formula $HNR_1R_2H^+$ $HCO_3^-$, with or without unreacted amine of the formula $HNR_1R_2$, and separating off the precipitation product of the reaction of the amine of the formula $HNR_1R_2$ with the precipitation reagent, preferably of the hydrogencarbonate of the formula $HNR_1R_2H^+$ $HCO_3^-$, giving rise to a product comprising CO, with or without unreacted amine of the formula $HNR_1R_2$.

In addition, a further aspect of the present invention is directed to an apparatus for production of CO from $CO_2$, comprising:

a first reactor for reaction of $CO_2$ with $H_2O$ and an amine of the formula $HNR_1R_2$ where $R_1$ and $R_2$ are the same or different and are selected from hydrogen and substituted and unsubstituted alkyl radicals having 1 to 20 carbon atoms to give a hydrogencarbonate of the formula $HNR_1R_2H^+$ $HCO_3^-$, which is designed to react $CO_2$ with $H_2O$ and an amine of the formula $HNR_1R_2$;

a second reactor for reaction of the hydrogencarbonate of the formula $HNR_1R_2H^+$ $HCO_3^-$ with hydrogen to give a formate of the formula $HNR_1R_2H^+$ $HCO_2^-$, which is designed to react the hydrogencarbonate of the formula $HNR_1R_2H^+$ $HCO_3^-$ with hydrogen to give a formate of the formula $HNR_1R_2H^+$ $HCO_2^-$; further comprising a third reactor for decomposition of the formate of the formula $HNR_1R_2H^+$ $HCO_2^-$ to $H_2O$ and an amide of the formula $HNR_1R_2$, which is designed to decompose the formate of the formula $HNR_1R_2H^+$ $HCO_2^-$ to $H_2O$ and an amide of the formula $HNR_1R_2$, and a fourth reactor for decomposition of the amide of the formula $HNR_1R_2$ to CO and an amine of the formula $HNR_1R_2$, which is designed to decompose the amide of the formula $HNR_1R_2$ to CO and an amine of the formula $HNR_1R_2$; or a combined third reactor for decomposition of the formate of the formula $HNR_1R_2H^+$ $HCO_2^-$ to $H_2O$, CO and an amine of the formula $HNR_1R_2$, which is designed to decompose the formate of the formula $HNR_1R_2H^+$ $HCO_2^-$ to $H_2O$, CO and an amine of formula $HNR_1R_2$; further comprising a fifth reactor for at least partial reaction of the amine of the formula $HNR_1R_2$ produced in the combined third reactor or in the fourth reactor with a precipitation reagent, preferably with $CO_2$, for production of a mixture comprising CO, a precipitation product of the reaction of the amine of the formula $HNR_1R_2$ with the precipitation reagent and any unreacted amine of the formula $HNR_1R_2$, preferably a mixture comprising CO, a hydrogencarbonate of the formula $HNR_1R_2H^+$ $HCO_3^-$ and any unreacted amine of the formula $HNR_1R_2$, and for removal of the precipitation product of the reaction of the amine of the formula $HNR_1R_2$ with the precipitation reagent, preferably of the hydrogencarbonate of the formula $HNR_1R_2H^+$ $HCO_2^-$, to form a product comprising CO, with or without unreacted amine of the formula $HNR_1R_2$, wherein the fifth reactor is designed to at least partly react the amine of the formula $HNR_1R_2$ produced in the combined third reactor or in the fourth reactor with a precipitation reagent, preferably with $CO_2$, to produce a mixture comprising CO, a precipitation product of the reaction of the amine of the formula $HNR_1R_2$ with the precipitation reagent and any unreacted amine of the formula $HNR_1R_2$, preferably a mixture comprising CO, a hydrogencarbonate of the formula $HNR_1R_2H^+$ $HCO_3^-$ and any unreacted amine of the formula $HNR_1R_2$, and wherein the first reactor is additionally designed for removal of the precipitation product of the reaction of the amine of the formula $HNR_1R_2$ with the precipitation reagent, preferably the hydrogencarbonate of the formula $HNR_1R_2H^+$ $HCO_3^-$.

Further aspects of the present invention can be inferred from the dependent claims and the more detailed description.

The appended drawings are intended to illustrate embodiments of the present invention and impart further understanding thereof. In connection with the description, they serve to elucidate concepts and principles of the invention. Other embodiments and many of the advantages mentioned are apparent with regard to the drawings. The elements of the drawings are not necessarily represented to scale with respect to one another. Elements, features and components that are identical, have the same function and the same effect are each given the same reference numerals in the figures of the drawings, unless stated otherwise.

BRIEF DESCRIPTION OF THE DRAWINGS

FIGS. 8 to 17 show illustrative apparatuses of the invention in schematic form.

DETAILED DESCRIPTION OF INVENTION

Figure 1:
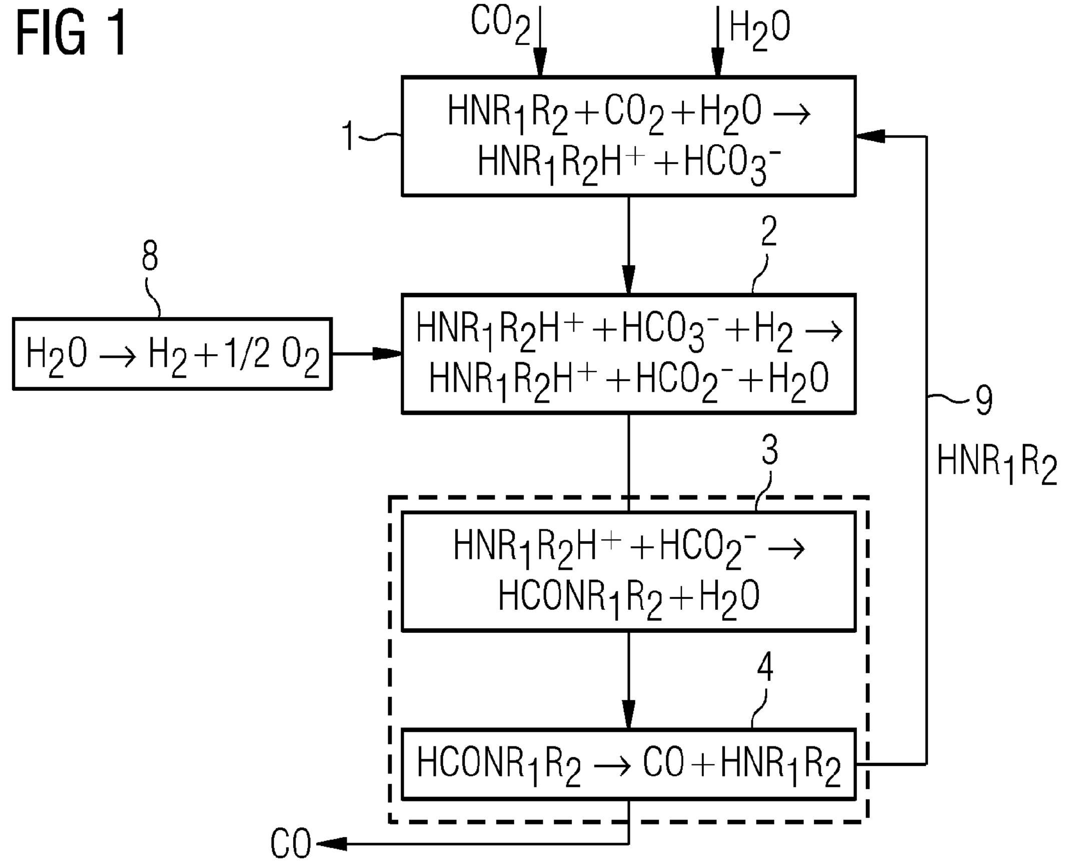
FIG. 1 shows a schematic of the reaction processes up to production of CO in an illustrative process of the invention.

Unless defined differently, technical and scientific expressions used herein have the same meaning as commonly understood by a person skilled in the art in the field of the invention.

In the application, figures are given in % by weight, unless stated otherwise or otherwise apparent from the context.

The amide of the formula $HCONR_1R_2$ is an amide of formic acid, and includes formamide and also N-alkyl and N,N-dialkyl derivatives of formamide.

Standard pressure is 101 325 Pa=1.01325 bar.

A first aspect of the present invention relates to a process for producing CO, comprising a) reacting $CO_2$ with water and an amine of the formula $HNR_1R_2$ where $R_1$ and $R_2$ are the same or different and are selected from hydrogen and substituted and unsubstituted alkyl radicals having 1 to 20 carbon atoms to give a hydrogencarbonate of the formula $HNR_1R_2H^+$ $HCO_3^-$;

b) reacting the hydrogencarbonate of the formula $HNR_1R_2H^+$ $HCO_3^-$ with hydrogen to give a formate of the formula $HNR_1R_2H^+$ $HCO_2^-$;

c) decomposing the formate of the formula $HNR_1R_2H^+$ $HCO_2^-$ to give an amide of the formula $HCONR_1R_2$ and $H_2O$;

d) decomposing the amide of the formula $HCONR_1R_2$ to give CO and an amine of the formula $HCONR_1R_2$, giving rise to a mixture comprising the need of the formula $HNR_1R_2$ and CO; and e) at least partly reacting the amine of the formula $HNR_1R_2$ in the mixture comprising the amine of the formula $HNR_1R_2$ and CO with a precipitation reagent, preferably with $CO_2$, for production of a mixture comprising CO and a precipitation product of the reaction of the amine of the formula $HNR_1R_2$ with the precipitation reagent, with or without unreacted amine of the formula $HCONR_1R_2$, preferably a mixture comprising CO and a hydrogencarbonate of the formula $HNR_1R_2H^+$ $HCO_3^-$, with or without unreacted amine of the formula $HCONR_1R_2$, and separating off the precipitation product of the reaction of the amine of the formula $HNR_1R_2$ with the precipitation reagent, preferably of the hydrogencarbonate of the formula $HNR_1R_2H^+$ $HCO_3^-$, giving rise to a product comprising CO, with or without unreacted amine of the formula $HNR_1R_2$.

More preferably, the ammonia derivatives are ammonium formate and formamide as intermediates, proceeding from ammonia.

As apparent from the above, in the process of the invention, steps a), b), c), d) and e) take place in that sequence, although it is not ruled out that particular steps are combined and, for example, take place in a reactor, for example steps c) and d) (no isolation of the amide of the formula $HCONR_1R_2$) and/or steps a) and b) or steps b) and c), etc.

In the process described, amines having a maximum of 2 non-H radicals, i.e. ammonia, primary and/or secondary amines, are utilized as intermediates, which results in particular advantages of the process in relation to production, transport and storage of CO, as further described hereinafter. The process sequence for production of CO in various processes with the aid of amines results in further advantages, for example simpler storage and transport of an intermediate formed, for example an amide. The process here consequently does not constitute a simple succession of steps; instead, the steps complement one another synergistically, both from a material and from an energy point of view, and result in a more efficient process for conversion of $CO_2$ to CO by comparison with prior art processes, as likewise set out further below. Moreover, the intermediate used may be recovered as intermediate and/or, in preferred embodiments, advantageously converted in step e) to a hydrogencarbonate of the formula $HNR_1R_2H^+$ $HCO_3^-$, such that it is available again and/or can also be reused as intermediate in the process and hence, in particular embodiments, the only by-product that occurs in the best case is oxygen from a water electrolysis.

In the process of the invention, step a) of reacting $CO_2$ with water and an amine of the formula $HCONR_1R_2$ where $R_1$ and $R_2$ are the same or different and are selected from hydrogen and substituted and unsubstituted alkyl radicals having 1 to 20 carbon atoms, where $R_1$ and $R_2$ may also form a ring, to give a hydrogencarbonate of the formula $HNR_1R_2H^+$ $HCO_3^-$ is not particularly restricted. For example, it is possible here to obtain $CO_2$ from a combustion of a hydrocarbonaceous substance and/or else from air in a suitable manner. For example, amine scrubbing operations are suitable methods of scrubbing $CO_2$ out of flue gases, for example. After the scrubbing reagent has been worked up, the hydrogencarbonate of the secondary amine can be converted directly to the corresponding amide of formic acid, for example formamide in the case of ammonia.

In step a), according to the amine used, ammonium hydrogencarbonate ($NH_4^+$ $HCO_3^-$), a substituted or unsubstituted alkylammonium hydrogencarbonate of the formula $H_2NR_1H^+$ $HCO_3^-$ and/or a substituted or unsubstituted dialkylammonium hydrogencarbonate of the formula $HNR_1R_2H^+$ $HCO_3^-$ may be produced, where, in the latter two cases, $R_1$ and $R_2$ are not H. Although it is not ruled out that mixtures of multiple amines are allowed to react with $CO_2$ and water in step a), it is preferable to react only one amine of the formula $HNR_1R_2$ with $CO_2$ and water, especially ammonia.

The amine of the formula $HNR_1R_2$ may be chosen arbitrarily in step a). In particular embodiments, $R_1$ and $R_2$ are selected from H and/or substituted and/or unsubstituted, for example unsubstituted, alkyl radicals having 1 to 10 carbon atoms, further preferably 1 to 8 carbon atoms, further preferably 1 to 6 carbon atoms, further preferably 1 to 4 carbon atoms, especially preferably 1 to 2 carbon atoms, where $R_1$ and $R_2$ may also form a ring, for example having 2 to 20, preferably 3 to 10, especially 3 to 6, carbon atoms, where $R_1$ and $R_2$ may be the same or different, for example the same. The alkyl radicals here may be linear, branched and/or cyclic and/or else may form a ring. If substituents are present in the alkyl radical, these are not particularly restricted, although it is not ruled out in the case of the dialkylamines that only one alkyl radical is substituted. Preferred substituents are especially hydrophilic groups, for example hydroxyl, amino, carboxyl and/or sulfo groups (—$SO_3H$), where hydroxyl groups are further preferable on account of the interaction with water, which is likewise used for reaction with the $CO_2$.

Examples of suitable alkyl radicals are, for example, methyl, hydroxymethyl, ethyl, hydroxyethyl, propyl, hydroxypropyl, butyl, hydroxybutyl, aminomethyl, aminoethyl, aminopropyl and aminobutyl groups, preferably methyl, hydroxymethyl, ethyl and hydroxyethyl groups. For example, preferred amines are thus ammonia, methylamine, dimethylamine, ethylamine, diethylamine, ethylmethylamine, n-propylamine, isopropylamine, di-n-propylamine, di-n-isopropylamine, n-butylamine, di-n-butylamine, pyrrolidine, piperidine, etc.; preference may be given, for example, to diethylamine, n-propylamine, n-butylamine, pyrrolidine and piperidine with regard to state of matter at room temperature of about 20° C. and solubility in water, whereas ammonia, for example, is advantageous from an energy point of view, as will be explained in more detail hereinafter. Furthermore, ammonia and alkylamines may be preferred with regard to decomposition of an amide produced. In particular embodiments, $R_1$ and $R_2$ are hydrogen, i.e. the amine used is ammonia.

Examples of possible amines can be seen in table 1 with their boiling points and solubilities in water, although the amine is not limited thereto. As apparent from table 1, a wide variety of different amines may be utilized, where $R_1$ and $R_2$ may be independent.

TABLE 1

List of illustrative amines and their boiling point and solubility in water at about 20° C.

| | Boiling point [° C.] | Solubility in water at about 20° C. [g/l] |
|---|---|---|
| $NH_3$ | −33 | 541 |
| Dimethylamine | 7 | 1540 |
| Diethylamine | 56 | Miscibility unlimited |
| Di-n-propylamine | 105 | 30 |
| Di-n-butylamine | 161 | 4 |
| Methylamine | −6.3 | 1080 |
| Ethylamine | 16 | Miscibility unlimited |
| n-Propylamine | 49 | Miscibility unlimited |
| n-Butylamine | 68 | Miscibility unlimited |
| Pyrrolidine | 87 | Miscibility unlimited |
| Piperidine | 106 | Miscibility unlimited |

In particular embodiments, the amine has a high boiling point of more than 25° C., preferably 30° C. or more, in order to be transportable in liquid form, and/or a solubility in water at 20° C. of at least 100 g/l, preferably at least 500 g/l, in order to have good transportability as a solution in water, especially with regard to reuse after step d) in another step a).

When a suitable amine having high boiling points is chosen, the CO product can be obtained easily by separating it from the liquid amine in gaseous form. If the boiling point is above the required decomposition temperature of the amide, the amine would already be left behind in liquid form and pure CO would escape, which is preferable.

However, if the boiling point is lower, it should preferably be between 30-180° C., advantageously between 100-180° C., since no major cooling efforts are required in the distillative removal of the amine. However, in the choice of amine, solubility/miscibility in/with water should be noted, in order not to slow step a).

In particular embodiments, step a) takes place in a solvent which is not particularly restricted. Steps b), c), d) and/or e) may take place in a solvent, with preferably at least steps a) to d) taking place in a solvent. The solvent here is not particularly restricted, but it is preferably hydrophilic and comprises, for example, water or mixtures with water. A preferred solvent is water.

In particular embodiments, the proportion of solvent, especially water, in step a) is at a minimum in order to minimize the energy expenditure the subsequent processes, for example in such a way that the amount is below the amount of solvent, especially water, at which saturation of the hydrogencarbonate of the formula $HNR_1R_2H^+ HCO_3^-$ in the solvent, especially water, occurs. Correspondingly, in such cases, step a) may give rise to a suspension or slurry. It may be necessary here to suitably adjust an amount of solvent, e.g. water, introduced, or it is also possible to partly remove solvent, e.g. water, for example when the $CO_2$ is provided from the air, for example in a carbon capture process.

In principle, step a) is thus comparable, for example, to a conventional amine scrubbing operation. By comparison, however, step a) of the process of the invention preferably differs by the solvent content, especially the water content, and/or the $CO_2$ content. In conventional amine scrubbing, the $CO_2$ and amine loadings, e.g. ammonia loadings, are much lower in preferred embodiments, and hence the water content is greater. In the present context, however, preference is given to introducing a greater amount of $CO_2$ and amine, for example 20-30% by weight of amine, e.g. ammonia, and 20% to 45% by weight of $CO_2$, e.g. 30% to 45% by weight of $CO_2$, and so the result may be a ratio of absorbate (amine, e.g. ammonia, and $CO_2$) and absorbent (solvent, e.g. water) of at least 1:1 (by weight). In the present context, for example, a mass ratio of amine of the formula $HNR_1R_2$ to solvent, for example ammonia to water, may be within a range from 1:0.5 to 1:4, preferably 1:1 to 1:2, for example in a superstoichiometric ratio of 1:1.4, in order to avoid any conveying of pure solids to subsequent steps. Preference is additionally given to an essentially stoichiometric ratio of amine of the formula $HNR_1R_2$ to $CO_2$, for example in a molar ratio of 2:1 to 1:2, preferably 1.5:1 to 1:1.5, for example about 1:1.

If the process of the invention is used for carbon capture from the air, which is also encompassed in the process of the invention, typically higher amounts of solvent, e.g. water contents, are needed since the partial pressures of $CO_2$ are much lower and hence lower concentrations in the aqueous phase are established at equilibrium, such that the result may be, for example, ratios of absorbate to absorbent of 1:2-4. For an equal product mass flow rate of hydrogencarbonate, a higher process mass flow rate is therefore required. With a higher proportion of solvent, e.g. a higher proportion of process water, there is a rise in process engineering complexity and energy expenditure for conveying or for thermal control of the process. Accordingly, in the case of carbon capture from the air, preference is given to further thermal integration in the process, for example with regard to a water electrolysis and/or in the further use of the CO, for example in a Fischer-Tropsch plant. Alternatively or additionally, in the case of a carbon capture process from the air, there may also be a reduction in the solvent content, e.g. water content, as a result of a mechanical or gravimetric separation, for example as a result of decanting or a settling centrifugation. In this case, however, preference is given to the oversaturation of the scrubbing solution. Heating for evaporation of the solvent may be counterproductive here, since the solvent equilibrium can move correspondingly.

On account of the rapid reaction kinetics of the reaction, for example the aqueous reaction, to form the ammonium hydrogencarbonate from amine, e.g. aqueous ammonia, and carbon dioxide, mass transfer limitation of the process in step a) is to be expected. As a result, in step a), preference is given to a reactor, a corresponding first reactor in the apparatus of the invention, having maximum mass transfer surface area.

In particular embodiments, in step a), a suspension is produced. For example, in the case of a low-water design of the plant, a product mixture formed in step a) may be composed of 5.6 $m^3$/day of an aqueous phase (with water as solvent) and 17.3 $m^3$/day of a solid phase (for example mainly ammonium hydrogencarbonate when the amine used is ammonia). For this purpose, in particular embodiments, in step a), preference is given to a first reactor suitable for a slurrylike and abrasive product mixture.

Figures 19, 20:
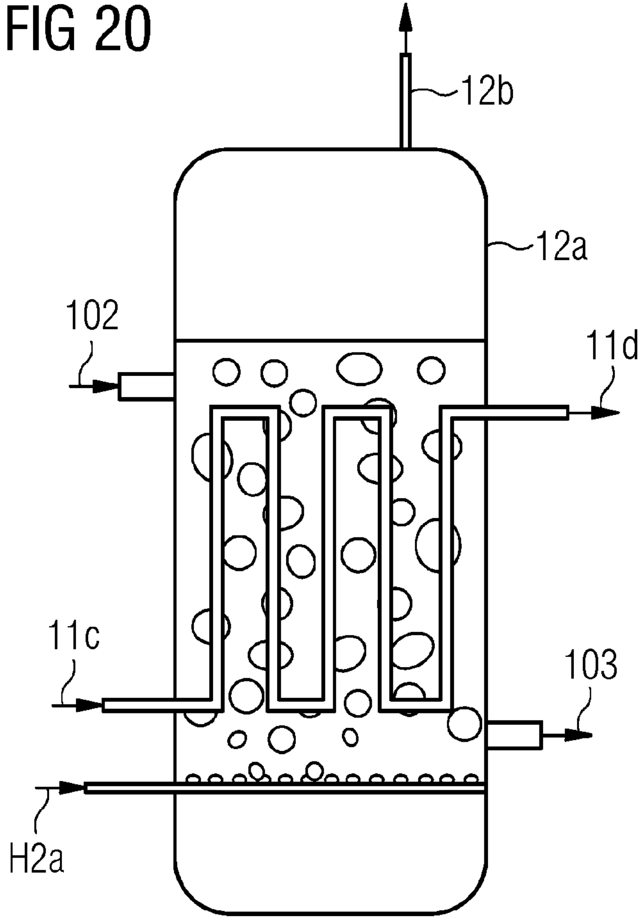
FIG. 19 shows a schematic of an illustrative first reactor, and FIG. 20 a schematic of an illustrative second reactor.

In particular embodiments, a first reactor is a preferably continuous crystallizer having a gas injection stirrer, or such a first reactor is used in step a). An illustrative first reactor is shown in FIG. 19, with a first conduit 101 or feed thereto, a second conduit 102 or drain thereto, a gas injection stirrer 11*a* and an optional heat exchanger 11*b* for establishment of a suitable reaction temperature. As shown here, reactants may be continuously pumped in circulation, and the product, hydrogencarbonate of the formula $HNR_1R_2H^+ HCO_3^-$, may be guided to the next step, step b). The slurrylike mixture is suitably conveyed, for example, by rotating displacement pumps, such as eccentric screw pumps.

In the case of a mode of operation in step a) with a relatively high solvent content, e.g. water content, as in the case of carbon capture, and an associated relatively low solids content, preference is given, for example, to packed columns or bubble columns having a high and highly dispersed gas phase as the first reactor in particular embodiments. This promotes mass transfer into the liquid phase by virtue of the relatively high exchange surface area. According to the solvent content, it is possible here to use displacement pumps having a relatively high delivery volume, for example rotary piston pumps or even centrifugal pumps, for conveying.

Through the use of other amines, for example those listed in table 1, it is possible to increase selectivity further for the hydrogencarbonate. According to the availability of the $CO_2$ source, a pressure-laden absorber column is likewise envisaged as the first reactor in particular embodiments, which promotes deposition of the hydrogencarbonate of the formula $HNR_1R_2H^+ HCO_3^-$, for example of ammonium hydrogencarbonate.

In particular embodiments, the hydrogencarbonate of the formula $HNR_1R_2H^+ HCO_3^-$ is produced by introducing $CO_2$ or a gas comprising $CO_2$ (for example in the case of a flue gas scrubbing operation) into or through amine $HNR_1R_2$ which is pure or essentially pure (>90% by weight, preferably >95% by weight, further preferably >99% by weight, based on the amine) and is dissolved in solvent, especially in water. However, it is also possible, for example, that solvent, e.g. water, is not included in the initial charge but, for example, is added, for example even in the gas phase, for example as steam, to $CO_2$ or a $CO_2$-containing gas.

It is advantageous here to work at the uppermost solubility limit of the amine in order to assure maximum conversion of matter. In particular, in step a), the hydrogencarbonate is obtained as a saturated solution or even as a suspension, for example in water, in which case the hydrogencarbonate here can correspondingly also be partly precipitated out in solid form. It can even optionally be dried, in order thus to be transported, for example, in solid form, for example to a suitable second reactor (the second in the apparatus of the invention) for performance of step b), although direct transport of a solution or suspension of the hydrogencarbonate to a reactor for step b) is also possible. Preference is given to direct transport from the first to the second reactor via at least one second conduit.

In particular embodiments, the $CO_2$, if it is not essentially pure (>90% by weight, preferably >95% by weight, further preferably >99% by weight, based on a mixture, e.g. gas mixture, comprising $CO_2$ which is introduced into step a)) or pure, is concentrated from a mixture, for example a gas mixture such as air, comprising $CO_2$, for example from flue gas. In other words, the $CO_2$, if it is not present at >90% by weight, preferably >95% by weight, further preferably >99% by weight, of $CO_2$, based on the mixture, can be enriched, in which case the manner of enrichment is not restricted and can also commence from small amounts >0% by weight, based on the mixture, as in the case of carbon capture from air.

Step b) of reacting the hydrogencarbonate of the formula $HNR_1R_2H^+ HCO_3^-$ with hydrogen to give a formate of the formula $HNR_1R_2H^+ HCO_2^-$ is likewise not particularly restricted. The hydrogencarbonate formed in step a) is hydrogenated in step b) with the aid of $H_2$ (for example from water electrolysis) to give the corresponding formate, e.g. ammonium formate.

Suitable methods of hydrogenation are known here, for example from Su et al.; (2015), "Highly Efficient Hydrogen Storage System Based on Ammonium Bicarbonate/Formate Redox Equilibrium over Palladium Nanocatalysts"; ChemSusChem 2015, 8, 813-816, to which reference is made with regard to the hydrogenation, although hydrogenation can generally also be effected with other suitable catalysts, in for example based on transition metals, e.g. Pd, Pt, Os, Ir, Rh, Ru, Ni, Co, Fe, etc., especially platinum group metals (Pd, Pt, Os, Jr, Rh, Ru), preferably Pd, Pt. The hydrogenation can be effected, for example, by introducing hydrogen, optionally together the catalyst, into a solution or suspension of the hydrogencarbonate in a suitable solvent, especially water, an appropriate reaction of hydrogen and hydrogencarbonate under suitable conditions. For this purpose, for example, a kind of fluidizing reactor or a tubular reactor with a solid catalyst phase is suitable, but without limitation thereto. In particular embodiments, step b) is conducted in a fluidizing reactor or a tubular reactor with a solid catalyst phase, and the second reactor in an apparatus of the invention may correspondingly be a fluidizing reactor or a tubular reactor having a solid catalyst phase.

For example, it is possible to hydrogenate dissolved hydrogencarbonate with hydrogen to formate under pressure in an autoclave. Hydrogenation of hydrogencarbonates to give formates is typically implemented with high yields; see, for example, for potassium or sodium, the literature Wiener et al.; (1988), "The Heterogeneous Catalytic Hydrogenation of Bicarbonate to Formate in Aqueous Solutions"; Journal of Catalysis 110, 184-190, or, for ammonium hydrogencarbonate, the article Su et al.; (2015), "Highly Efficient Hydrogen Storage System Based on Ammonium Bicarbonate/Formate Redox Equilibrium over Palladium Nanocatalysts"; ChemSusChem 2015, 8, 813-816, with yields of, for example, more than 95% at a pressure, for example, of 27.5 bar and within a period t=15 h.

In terms of apparatus, process step b) or step b) may be conducted in a slurry reactor in particular preferred embodiments, especially with a suitable catalyst, for example a finely divided palladium catalyst. Correspondingly, in an apparatus of the invention, a preferred second reactor is a slurry reactor.

An illustrative slurry reactor **12*a* is shown in schematic form in FIG. 20. In this case, via the second hydrogen feed conduit 102, the hydrogencarbonate is fed in from the first reactor and hydrogen via conduit H2a, and the product produced, formate of the formula $HNR_1R_2H^+ HCO_2^-$, is removed via the third conduit 103 in the direction of the third reactor. Moreover, the slurry reactor 12*a* also has an outlet 12*b* for gas (purge), and a feed 11*c* and drain 11*d*** for a heat carrier for utilization of the energy generated.

The process conditions of the hydrogenation in a second reactor or in step b), for example in a slurry reactor, are not particularly restricted, and may, for example, be within a temperature range from 20 to 80° C., for example 40 to 70° C., e.g. about 60° C., and/or within a suitable positive pressure range, for example 5 to 35 bar, for example 15 to 30 bar, e.g. about 27.5 bar. In addition to a possible electrochemical compression in a water electrolysis, hydrogen should therefore preferably be (additionally) compressed and then brought to the reaction temperature of the 2nd step. However, the energy expenditure necessary for the purpose of isentropic compression with an efficiency of 72% and a requirement for cooling is ideally lower and may, for example, be 0.1 MW, as shown in an example that follows later.

The task of conveying the multiphase reactant mixture at reaction pressure may be assumed, by way of example, by an eccentric screw pump, preferably with subsequent cooling. On account of the incompressible character of the slurrylike reaction mixture, the compression is associated with a low energy expenditure.

The water obtained in process step b) can be utilized for heating of the entire process as internal heat carrier medium by backward integration, and is preferably removed only later on in the process, especially after step d), in order to avoid accumulation of by-products. Purification of such a stream separated off at a later stage enables virtually complete recovery of the amine of the formula $HNR_1R_2$ used in the process, e.g. ammonia. Furthermore, the purified water can be fed back to a water electrolyzer as reactant either as process water, i.e. as solvent, or with removal of ionic components.

For the 3-phasic reaction step b), conceivable second reactors are additionally also the reactor types of trickle bed, bubble column with packing and fluidized bed reactors as second reactor. The enthalpy of reaction of the exothermic hydrogenation is −21.359 kJ/mol for ammonia. The removal of heat from the reactor which is thus necessary on a larger scale can be utilized for the preheating of the next step c).

The source for the hydrogen for step b) is likewise not particularly restricted. In particular embodiments, the hydrogen used in step b) is produced by a water electrolysis which is preferably conducted by renewable energies. In this way, hydrogen can be obtained in very pure form and efficiently, and the only by-product formed is oxygen. In addition, water can be released in steps b) and/or c), which can be used, for example, for a water electrolysis and/or may serve as solvent in the process. In addition, the overall process with use of a water electrolysis results in an excellent energy balance, since waste heat from the water electrolysis can be used efficiently in the continuation of the process, for example step c), for example even in the case of an integrated process. The water electrolysis is not particularly restricted and can be effected, for example, at a pressure of 1 to 10 bar, preferably 3 to 5 bar; it is possible at such a pressure to achieve a good yield and suitable efficiency with regard to the stream introduced, such that the waste heat can suitably be used, for example, for performance of step c).

Even though it is possible to transport hydrogen from a hydrogen electrolyzer to a reactor for step b) even over long distances, it is preferable to conduct step b) in the vicinity, for example at a distance of less than 50 km, further preferably less than 20 km, even further preferably less than 10 km, of a water electrolyzer, such that $H_2$ from the water electrolyzer is routed with a suitable conduit, for example a pipe, directly to a reactor (e.g. second reactor in the apparatus of the invention) for performance of step b).

In particular embodiments, step b) of hydrogenation is effected with a solution, especially saturated solution, of the hydrogencarbonate, for example an aqueous solution.

In addition, step c) of the decomposition of the formate of the formula $HNR_1R_2H^+ HCO_2^-$ to an amide of the formula $HCONR_1R_2$ and $H_2O$ is not particularly restricted.

The reaction step is highly endothermic, for example with an enthalpy of reaction of 94.6 kJ/mol for ammonium formate, and it can therefore be assumed that, as well as the preheating to a suitable operating temperature, for example of about 140° C. for ammonium formate, the third reactor used here itself constitutes a major heatsink. This sink may be compensated for, for example, by backward integration of the product stream, for example suitable preheating by means of a heat exchanger, and/or integration of the waste heat from further exothermic processes, for example from a water hydrolysis and/or especially from further processing of the CO finally formed, for example in a Fischer-Tropsch process.

The resultant formate, for example ammonium formate, is decomposed, for example, with supply of heat to give the corresponding amide, for example formamide, and water. The decomposition commences, for example, above 150° C. An example that may be cited is ammonium formate, which decomposes to give formamide and water over and above about 170° C., as described in U.S. Pat. No. 1,582,675: Production of formamide from ammonium formate, and to which reference is made with regard to the preparation of amides from formates.

For example, the main use of ammonium formate in industry is the provision of formamide by the decomposition of the formate. This involves heating ammonium formates to more than 170° C., and it decomposes to give formamide and water. An illustrative possible reaction of ammonia formate can be seen in U.S. Pat. No. 1,582,675: Production of formamide, wherein preferably pure formamide is extracted.

In particular embodiments, waste heat from a water electrolysis is used for the production of hydrogen for step b) in order to perform step c). Correspondingly, it is preferable to conduct steps b) and c) in spatial proximity, for example at a distance of less than 50 km, further preferably less than 20 km, even further preferably less than 10 km, from one another.

Reaction step c) preferably proceeds in the liquid phase, for example in water as solvent, but it is possible to drive out the gases dissolved in step a) in a solvent such as water in the heating of the reaction mixture. If water is used as solvent, a large portion of the water involved in the process is additionally present in the gas phase at an illustrative reaction pressure of 1 bar. For that reason, a preferred reactor configuration, or a preferred third reactor, is a catalyst-packed tubular reactor—in which case the catalyst is not particularly restricted—or a shell and tube reactor.

In order to increase the conversion, in particular embodiments, it is additionally possible to add the amine of the formula $HNR_1R_2$, especially ammonia, to the gas phase.

In particular embodiments, the water formed in the previous reaction step b) and/or the absorbent or solvent from step a) can be separated off before preheating the reaction mixture before step c), for example by distillation, for example with utilization of the waste heat from a Fischer-Tropsch process. This enables smaller mass flow rates in steps c) and d) and the subsequent purification sequence comprising step e) and possibly further steps, but may make it more difficult to convey the reaction mixture which is possibly at least partly in solid form.

Step d) of the decomposition of the amide of the formula $HCONR_1R_2$ to give CO and an amine of the formula $HNR_1R_2$ is not particularly restricted either. The amide, for example formamide, can be decomposed by energy supply (including further energy supply) to CO and the starting amine, which can then ultimately be used again in step a), for example after step e). As is apparent, steps c) and d) may take place at separate sites, i.e., for example, in separate reactors (for example in a third and fourth reactor of an apparatus of the invention, optionally with intermediate isolation of the amine or at least a preparation of the amide and transport or conduction between third and fourth reactors), or in a common reactor (for example the combined third reactor in an apparatus of the invention without isolation of the amide, in which case the amide can of course form as an intermediate in the combined third reactor).

On account of the low enthalpy of reaction in step d) of, for example, 19.35 kJ/mol in the case of formamide, it can be assumed that a small input of heat is necessary. This is dominated by the preheating, for example to 180° C. as mentioned in the case of formamide. In this case too, on account of the temperature level, integration of the sequence of subsequent processes, for example of a Fischer-Tropsch process, as described above, or other exothermic processes is possible.

The decomposition to give CO and amine in step d) may depend not just on the temperature in step d) but also, for example, on the presence or absence of a catalyst, which is not particularly restricted. Preferably, step d) takes place at pressures of less than 7 bar, preferably 4 bar or less, for example 2 bar or less.

In step d), the amide of the formula $HCONR_1R_2$ is decomposed to give CO and an amine of the formula $HNR_1R_2$. By means of suitable temperature adjustment and/or control, it is also possible here to avoid decomposition to other products such as HCN or polymeric products. The temperature can be adjusted suitably depending on the original amine and the formate or amide correspondingly formed.

For this preferably uncatalyzed process in step d), it is possible, for example, to utilize an evaporation tank as the fourth reactor. This makes it possible for the product gas is to flow out, for example $NH_3$ and CO in the case of formamide, and optionally the solvent, for example the water vapor, in which case this may also be entrained from step c). By means of at least one heat exchanger, it is possible in particular embodiments to suitably cool the mixture formed in step d), for example a steam-product gas mixture, for example to 60-100° C., preferably 70 to 90° C., for example about 84° C. The condensation of high-boiling constituents can give rise here to a reduced pressure, which can assume the task of conveying the vapor mixture from the fourth reactor to the heat exchanger.

By virtue of the cooling and the associated phase separation, in particular embodiments before step e), it is possible to remove a solvent phase, preferably the phase consisting mainly of water. This can be effected in a suitable separation apparatus, preferably disposed between the fourth reactor and the fifth reactor in flow direction and designed to at least partly separate a solvent and/or water from the CO and the amine of the formula $HNR_1R_2$. Thereafter, it is likewise possible before step e) for there to be further cooling if appropriate. In order, for example, to control the water content in the purification step e) and any further steps, however, there is only slight cooling, for example within a range from 5 to 30° C., for example 10 to 20° C., for example 15 to 17° C. For example, the product stream in the formamide decomposition can be cooled down merely from 84° C. to 68° C.

As is apparent from the above, it is preferable in particular embodiments that steps a) to d) are effected in a solvent, especially water. It is also preferable, in particular embodiments, that the solvent is at least partly separated off before step e), preferably between step d) and step e). In this way, it is possible to conduct step e) and any further steps more efficiently and with lower energy expenditure. Alternatively or additionally, it is possible in particular embodiments to at least partly separate off water from the reaction in step b) and/or c), preferably before step e), especially between steps d) and e).

In particular embodiments, solvent separated off before step e) and/or water from the reaction in step b) and/or c) may be at least partly fed back to step a) and/or, in the case of water, optionally to a water electrolysis. For example, the water released from the hydrogenation or from the decomposition to give the amide, e.g. formamide, can thus also be fed back to the cycle in step a) and/or in the water electrolysis. However, this may depend on the site and the possibility of integration into the overall plant. The recycling can reduce the demand for solvent and/or water, and can additionally simplify subsequent purification.

If a removal is conducted, a gas product stream containing the CO product gas and a liquid stream may be formed, which may each be cooled independently on their own, or both may be cooled, correspondingly in a product gas cooling apparatus or a liquid stream cooling apparatus, neither of which is particularly restricted. The product gas stream or the product from step d) are then fed to step e), which may in principle again constitute a kind of "scrubbing", wherein the end of the formula $HCONR_1R_2$ can be converted by reaction and then the precipitation product can be suitably removed.

Step e) of at least partly reacting the amine of the formula $HCONR_1R_2$ in the mixture comprising the amine of the formula $HCONR_1R_2$ and CO with a precipitation reagent, preferably with $CO_2$, for production of a mixture comprising CO and a precipitation product of the reaction of the amine of the formula $HCONR_1R_2$ with the precipitation reagent, with or without unreacted amine of the formula $HNR_1R_2$, preferably a mixture comprising CO and a hydrogencarbonate of the formula $HNR_1R_2H^+$ $HCO_3^-$, with or without unreacted amine of the formula $HNR_1R_2$, and of separating off the precipitation product of the reaction of the amine of the formula $HCONR_1R_2$ with the precipitation reagent, preferably of the hydrogencarbonate of the formula $HNR_1R_2H^+$ $HCO_3^-$, giving rise to a product comprising CO, with or without unreacted amine of the formula $HNR_1R_2$, is not particularly restricted. In the ideal case, the amine of the formula $HCONR_1R_2$ is converted qualitatively in step e), and the CO can be obtained as a pure product. However, the CO after step c) may also still contain unreacted amine of the formula $HNR_1R_2$, which can then be removed in subsequent steps, as described hereinafter. However, the performance of step e) can make the subsequent purification more efficient or even avoid it entirely. In step e), the precipitation reagent for the amine of the formula $HCONR_1R_2$ is not particularly restricted, but is preferably $CO_2$, which can suitably be fed into a fifth reactor for step e). Use of $CO_2$ gives rise to the hydrogencarbonate of the formula $HNR_1R_2H^+$ $HCO_3^-$, which, in preferred embodiments, after being removed in step e), is fed back to b), where it can correspondingly be reacted in turn to give formate with hydrogencarbonate from step a).

In particular, it is preferable that the amine used is ammonia, in which case step e), with use of $CO_2$ as precipitation reagent, constitutes a kind of reverse ammonia scrubbing, wherein the ammonia is scrubbed out.

As a result of step e), the product formed here, for example a product gas, is enriched with CO, and the aim is precipitated out. This enables lower energy expenditure for any highly selective CO purification conducted downstream, for example in at least one coldbox, before the CO is used further, for example in a Fischer-Tropsch synthesis.

In particular embodiments, step e) is conducted at a temperature level of 30-60° C. and/or a pressure level 0.5 to 2 bar, preferably about 1 bar, since low temperatures lead to a higher yield of precipitation product, for example ammonium hydrogencarbonate in the case of use of ammonia and $CO_2$, and a more efficient deposition process.

If step e) is conducted with $CO_2$ as precipitation reagent, the ratio of $CO_2$ supplied in step a) to $CO_2$ supplied in step e) is not particularly restricted. It may, for example, be within a molar ratio of 90:10 to 10:90, preferably 80:20 to 20:80, further preferably 70:30 to 30:70, even further preferably 55:45 to 35:65, especially 55:45 to 40:60. In the case of ammonia as amine, for example, the result is a good ratio within the ranges mentioned, especially of about 44-45 to about 55-56, which may be due here to a shift in equilibrium as a result of the heating after step b) and/or the presence of solvent, e.g. water.

It is also possible here with steps a) to e), as explained above, for there to be efficient backward integration of heat from subsequent processes with CO, for example a Fischer-Tropsch synthesis.

After step e), after the removal of the precipitation product, the result is a product comprising CO, especially a purified product gas stream which may contain a relatively low to large proportion of amine of the formula $HNR_1R_2$, e.g. $NH_3$, of, for example, 0% to 60% by weight (also depending on the amine used). The unreacted amine of the formula $HNR_1R_2$, e.g. $NH_3$, present in the product comprising CO, in particular embodiments, is separated off in a step f), meaning that the process in particular embodiments further comprises a step f) of separating the CO from product comprising CO and unreacted amine of the formula $HNR_1R_2$. Thereafter, the high-purity CO can be sent to downstream processes, for example a Fischer-Tropsch synthesis for a suitable backward integration of heat into the overall process. Step f) is not particularly restricted and can be effected, for example, by a suitable cryogenic method, for example with at least one coldbox, for example two or more coldboxes. They mean separated off may, in particular embodiments, be heated by a suitable preheating device, for example including a heat exchanger coupled within the overall process, back to a suitable temperature, for example to 20 to 40° C., for example to about 30° C., and then fed back to step a) in order to be reused therein. In this way, it is possible to close the amine circuit, for example the ammonia circuit, of the process. If the preheating is dispensed with, the amine recycled may comprise solid constituents, which can make recycling difficult.

In particular embodiments, in addition, the solvent separated off before step d) and/or water is purified, wherein by products of the reaction with amine may also be present. This can in turn be reacted in such a way that the amine can be recovered from this solvent and/or water as well, and this can then likewise be recycled to step a), such that virtually complete regeneration of the amine, for example of the ammonia, is possible.

As set out above, step f), in particular embodiments, may be followed by a further reaction of the CO, especially a Fischer-Tropsch synthesis. In particular embodiments, energy is provided in step c) and/or d) by a further reaction of CO, preferably by further reaction of CO in a Fischer-Tropsch synthesis.

A process of the invention, at a minimum, includes four reaction steps up to the production of CO—wherein step e) constitutes a purification step—which are summarized by way of example and in schematic form for CO formation via amides with further optional steps in FIG. 1.

FIG. 1 here already shows all the relevant reactions for CO production.

Step a) is conducted here in reaction 1, and results in the following reaction equation:

$$HNR_1R_2+CO_2+H_2O\rightarrow[HNR_1R_2H]^+[HCO_3]^-$$

Likewise shown is a preferred intermediate step 8 of the water electrolysis for provision of hydrogen:

$$H_2O\rightarrow H_2+\frac{1}{2}O_2$$

Step b) is conducted in reaction 2, with the following reaction equation:

$$[HNR_1R_2H]^+[HCO_3]^-+H_2\rightarrow[HNR_1R_2H]^+[HCO_2]^-+H_2O$$

Step c) is conducted in reaction 3, with the following reaction equation:

$$[HNR_1R_2H]^+[HCO_2]^-\rightarrow HCONR_1R_2+H_2O$$

Step d) is conducted in reaction 4, with the following reaction equation:

$$HCONR_1R_2\rightarrow CO+HNR_1R_2$$

The sum total of all the reactions is then:

$$CO_2\rightarrow CO+\frac{1}{2}O_2,\Delta H_R=282.96\text{ kJ/mol}$$

Additionally shown in FIG. 1 is a preferred step 9 in which the amine of the formula $HNR_1R_2$ from reaction 4 is recycled for a new reaction 1, with preferred recycling here into step d) in the production of CO, since the amine can theoretically be quantitatively retained. This recycling in the present process preferably follows after the removal in step e), as explained above, which is not shown in FIG. 1 for reasons of easier comprehensibility.

In the process of the invention, all steps may be conducted at different sites, or individual or else preferably all steps may be combined at one site. Especially steps c) and d) may also be conducted sequentially in the same reactor (combined third reactor in the apparatus of the invention).

In particular embodiments, the process of the invention further comprises a reuse of the amine of the formula $HNR_1R_2$ produced in step d) in a new step a) and/or as hydrogencarbonate after step e) in step b). In a subsequent step, the amine obtained in particular, for example ammonia, may be dissolved again in water and hence separated from the CO. This may lead to a high proportion of >70% by weight, preferably >80% by weight, especially >90% by weight, of CO, or even to pure CO, in the product after this step, based on the product, and a closed amine circuit, for example ammonia circuit, may be established. By-products from the decomposition of the amide may possibly be present, but it is preferable that, in step d), the amide is decomposed virtually quantitatively or even quantitatively to CO and amine.

As explained above, the CO may be separated off after step e), i.e. separated, for example, from a mixture comprising CO and the amine of the formula $HNR_1R_2$, and optionally further products such as polymeric products, etc. However, preference is given to the production of essentially, i.e. >90% by weight, preferably >95% by weight, further preferably >99% by weight, or even 100% by weight, based on decomposition product, of CO.

In particular embodiments, in step d), the amine is essentially decomposed, i.e. to an extent of >90% by weight, preferably >95% by weight, further preferably >99% by weight, or even completely, based on the decomposition products, to CO and the amine of the formula $HNR_1R_2$.

In the present context, a wet scrubbing operation is used for a removal of amines, especially ammonia. In the present process, such a wet scrubbing operation here may be envisaged in that, for this purpose, a mixture comprising water and $CO_2$, for example moistened gas comprising $CO_2$, preferably with high purity based on $CO_2$ in the gas of, for example, >70% by weight, preferably >80% by weight, especially >90% by weight, based on the gas, for example from flue gas, is used. In particular embodiments, this may be introduced into, for example blown into, step e) in essentially stoichiometrically correct form or with a slight excess of >1:1, for example >1.05:1, for example >1.1:1, although step e) follows after step d). Correspondingly, it is possible here again to form the hydrogencarbonate of the formula $HNR_1R_2H^+$ $HCO_3^-$. In this way, it is possible to purify the product gas directly and to precipitate and separate off hydrogencarbonate directly in solid form.

In particular embodiments, steps c) and d) are effected in a common reactor. This is an option especially when a product produced from step d), especially CO, can be used further straight away in the vicinity, for example at a distance of less than 50 km, further preferably less than 20 km, even further preferably less than 10 km, of the common reactor and/or when the formate can likewise be produced in the vicinity, especially when a water electrolysis is in the spatial vicinity, or can be transported in a simple manner. In this way, it is possible to obtain an efficient process.

In particular embodiments, steps c) and d) are effected at a first and at a second site. In particular embodiments, the amide of the formula $HCONR_1R_2$ produced in step c) is transported from the first to the second site. This is advantageous especially in the case of long transport distances, since CO in particular should preferably be produced by decomposition at a site where it can be used further, for example within the scope of a chemical synthesis, for example a Fischer-Tropsch synthesis, or chain extension reactions in crackers, etc. Transport of the amide is easier to arrange here for longer transport distances, for example more than 30 km, more than 50 km or even more than 100 km. It is also advantageous here that the amide after step c) and also the amine after step d) can optionally be stored in a simple manner, for which purpose storage apparatuses may also be provided correspondingly in an apparatus of the invention.

However, also within the scope of the invention is transportation of the formate of the formula $HNR_1R_2H^+$ $HCO_2^-$ between different sites instead of the amide or in addition, i.e., for example, transportation of formate after step b) from a first site to a second site at which step c) and step d) are conducted, or to a second site where step c) is conducted, and then the amide is transported to a third site where the amide is decomposed in a step d). However, this is not preferable in accordance with the invention. And it is also not ruled out that the hydrogencarbonate of the formula $HNR_1R_2H^+$ $HCO_3^-$ is alternatively or additionally transported, but this too is not preferred. Correspondingly, there is even the possibility of three transportations of hydrogencarbonate, of formate and of amide, in order to conduct steps a), b), c) and d) at different sites, and this may then also be followed by further transportation of amine of the formula $HNR_1R_2$, which can then be brought back to a site where step a) is conducted, in which case this may be the same site as in the first step a) or a different one. It is preferable, however, that at least steps a) to c) are effected in an integrated manner, and integrated performance of steps a) to e) is especially preferable.

In particular embodiments, water released in step b) and/or c) is sent to the water electrolysis, if present. In this way, it is possible to lower costs further and to further reduce impairment of the environment, especially since water is theoretically not consumed either in the present process. Correspondingly, steps b) and/or c) are preferably conducted here in spatial proximity, for example at a distance of less than 50 km, further preferably less than 20 km, even further preferably less than 10 km, from a water electrolysis facility.

In particular embodiments, water released in step b) and/or c) is sent to step a). Here too, it is advantageous that there is a cost saving and lesser impairment of the environment. Another possibility is a combination of the supply of the water released in steps b) and/or c) to step a) and any water electrolysis present, and the water recycling here may be suitably provided in order to optimally utilize water in the process for the purpose of circulation. Correspondingly, the water released from the hydrogenation and/or from the decomposition to give the amide, e.g. formamide, can be fed back to a cycle in step a) and/or in the water electrolysis.

In particular embodiments, energy is provided in step c) and/or d) by a further reaction of CO, preferably by further reaction of CO in a Fischer-Tropsch synthesis. This allows the present process to be optimized further with regard to synergies in respect of downstream processes, in order to viably use the energy "stored" in CO for the production thereof, since there is a multitude of possible exothermic further reactions in which CO can be employed.

In particular embodiments, waste heat from the water electrolysis is used for the performance of step c), for example, although it is not ruled out that waste heat therefrom is also used additionally or alternatively for step d) and/or else is employed in step b). In this way, it is possible to utilize the waste heat typically obtained in water electrolysis in an industrially viable manner and to further improve synergy in the present process.

Correspondingly, in a process of the invention, both in the case of production of CO at one site and in the case of division of the sites, it is possible to use waste heat from the steps in order to make the production of CO more energy-efficient and hence to further increase the synergy of the process steps.

Figure 2:
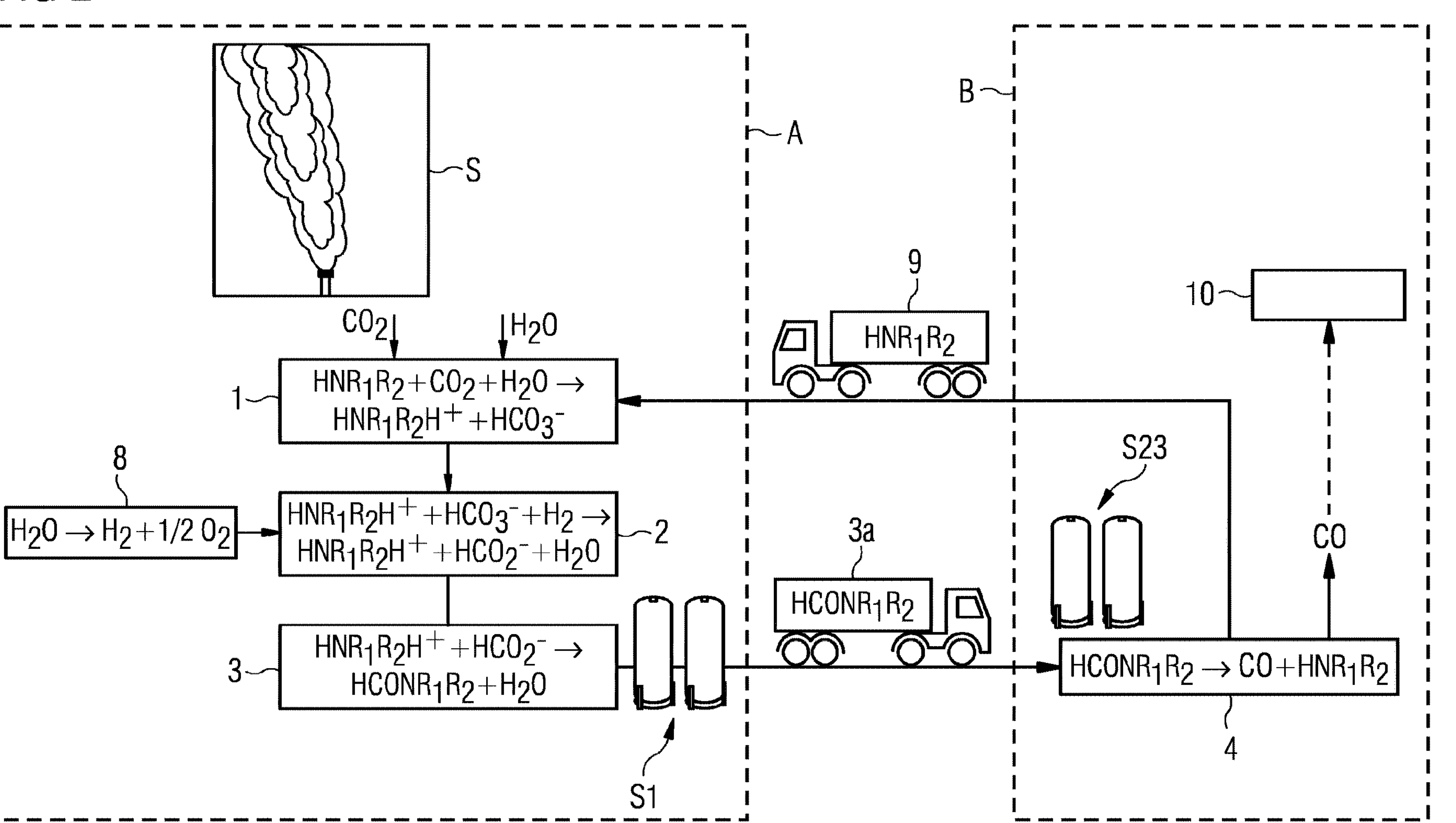
FIG. 2 shows a schematic of a further illustrative process without the CO purification, in which the role of an amide as storage medium and transport option for CO is also illustrated.

A further illustrative process of the invention with transportation between different sites is shown schematically in FIG. 2, in which steps 1 to 4 and 8 correspond to those of FIG. 1.

Production part A of the process shown here represents the production of the amide of the formula $HCONR_1R_2$ as intermediate and "storage product" of CO, which, for example, may advantageously be located at a $CO_2$ point source S. Production part B here shows, by way of example, the formation and further use of CO. The amide of the formula $HCONR_1R_2$ may be stored intermediately both in production part A and B in tanks S1, S23, and transported in between in a step 3*a*, especially at ambient pressure, to the further processing site. Here, step d) is then effected in reaction 4, the amide is thermally decomposed, and the CO obtained can be processed further directly in a subsequent process 10, for example a Fischer-Tropsch synthesis. The resulting amine can in turn be transported back to the production site for the amide in step 9. It is also possible to spatially separate the hydrogenation step, optionally with corresponding transport of the hydrogencarbonate of the formula $HNR_1R_2H^+$ $HCO_3^-$.

It is preferably possible in the process of the invention to provide the amide, for example formamide, and/or the formate in liquid form, as a result of which transportation between reactors is simpler and the molecular density is very much higher. In the case of formamide (methenamide, m=45 g/mol), for example, the proportion by mass of CO (m=28 g/mol) is 62%. It is thus possible to store about 703 kg of CO in 1 $m^3$ of formamide (1 bar, ambient temperature, density=1.13 $g/cm^3$).

In order to store the same amount of gaseous CO (assuming a gas bottle at 200 bar), 3.1 $m^3$ would thus be needed, which constitutes three times the volume and makes transport and safety less efficient and more hazardous.

In the case of transportation back, ammonia as amine, for example, may be liquefied (900 kPa at 20° C.) and transported back. 1 $m^3$ of liquid $NH_3$ corresponds to 682 kg, which is about 40 000 mol/$m^3$. By way of comparison: 1 $m^3$ of formamide as supplied corresponds to about 25 000 mol/$m^3$. Therefore, the ammonia formed can be returned directly on decomposition without requiring additional volumes on transportation. If the amine reacts again with $CO_2$, as described above, i.e., for example, $CO_2$ is also used for separation of CO and amine, another possibility is of course transport in the form of hydrogencarbonate.

The utilization of an amine which is liquid at room temperature or even transport temperature (e.g. up to 40° C. or even up to 50° C.), for example of diethylamine, as starting amine additionally allows liquefaction to be dispensed with, since it is liquid at ambient temperature (see table 1).

Illustrative processes of the invention are shown in schematic form in FIGS. 3 to 7.

Figure 3:
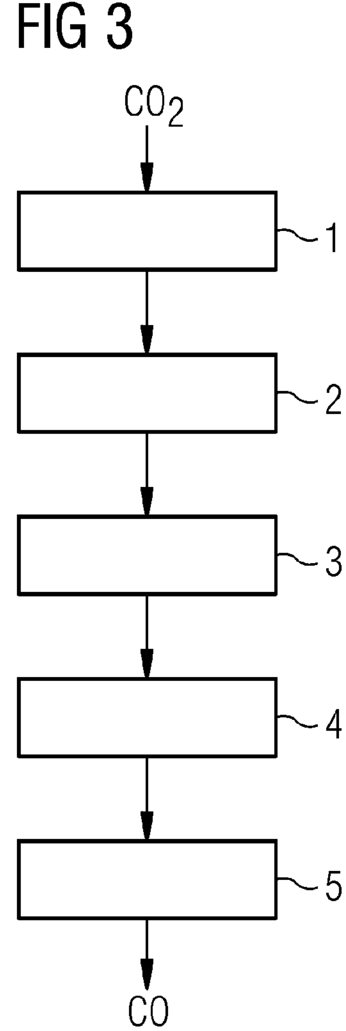
FIGS. 3 to 7 show illustrative processes of the invention in schematic form.
Figure 4:
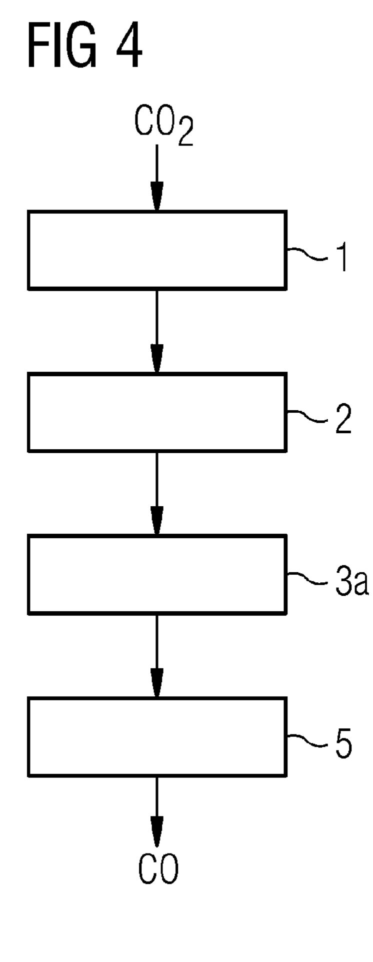
Figure 5:
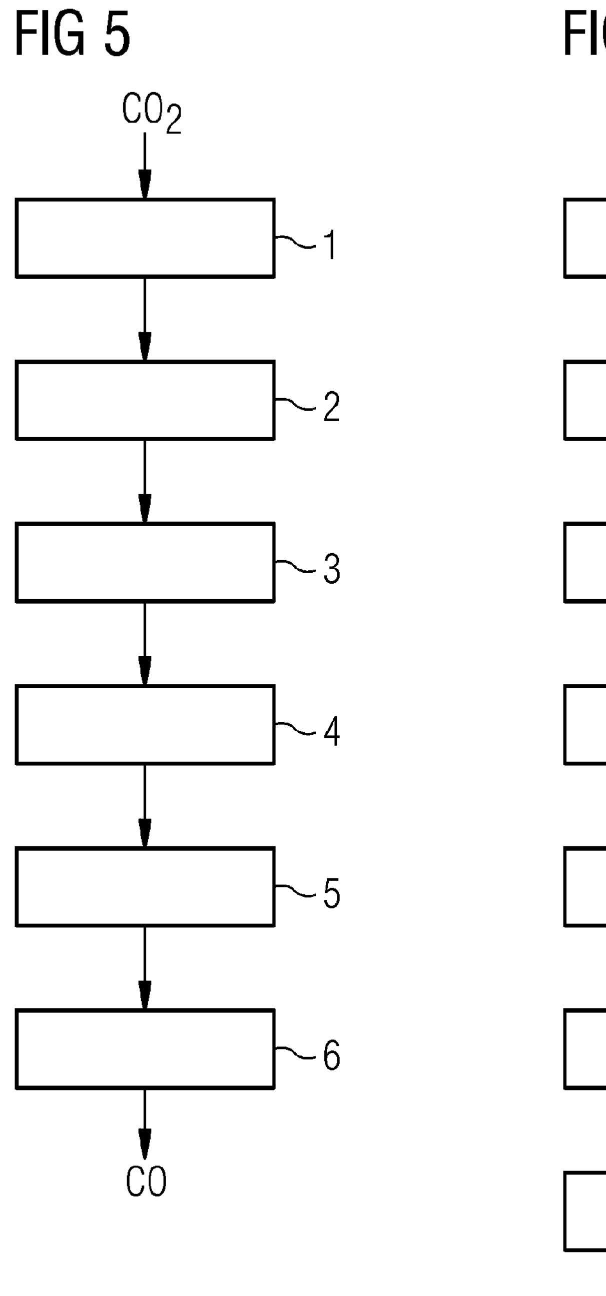
Figure 6:
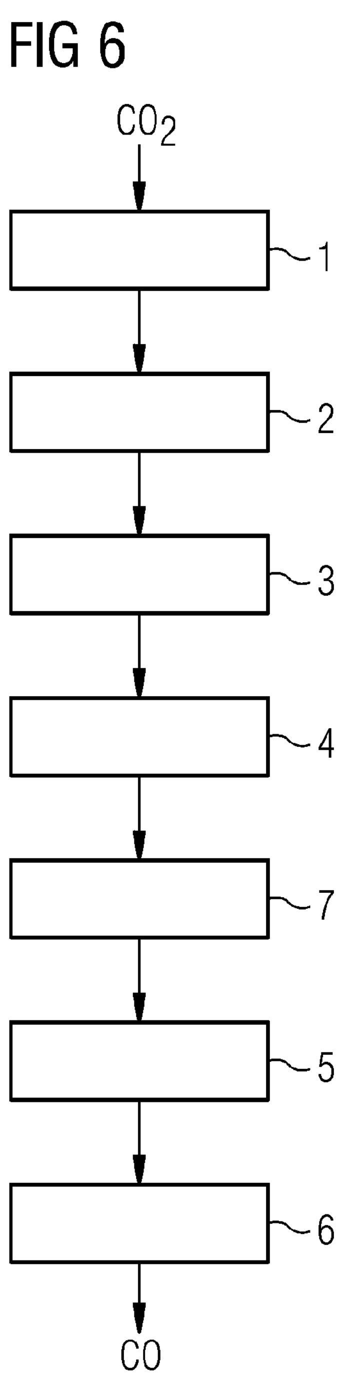
Figure 7:
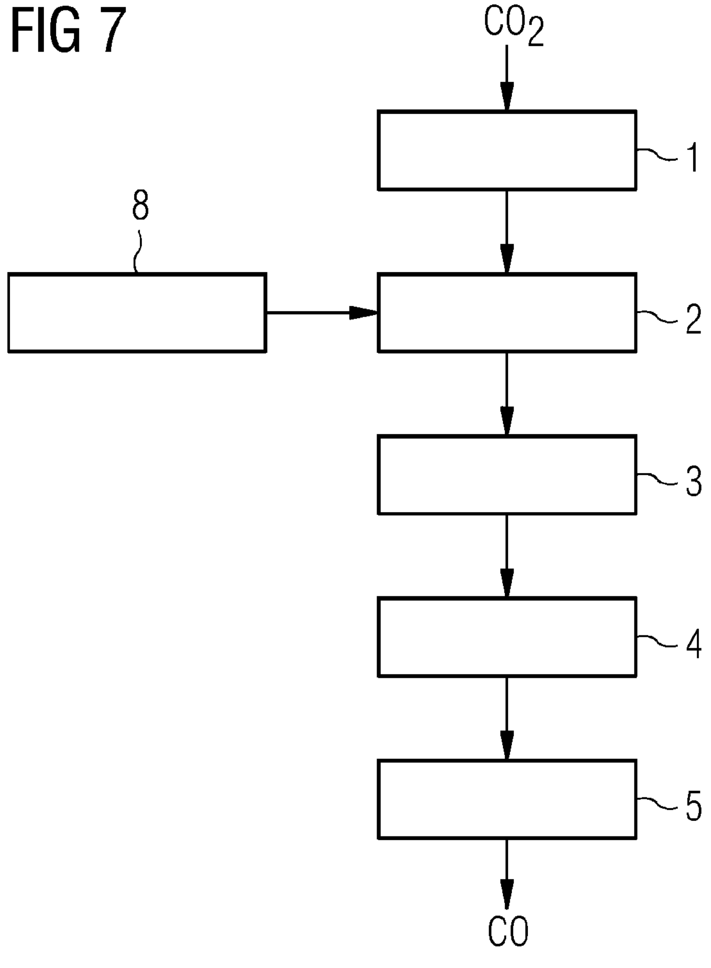

In FIG. 3, the preparation of CO from $CO_2$ is effected here via reaction 1 in step a), reaction 2 in step b), reaction 3 in step c), reaction 4 in step d), and the reaction and removal 5 in step e). In FIG. 4, reactions 3 and 4 are combined in one reaction 3*a* in which steps c) and d) are combined. In the process shown in FIG. 5, by comparison with FIG. 3, reaction and removal 5 in step e) followed by the purification 6 in step f). Proceeding from FIG. 5, in the process of FIG. 6, a removal step 7 for solvent and/or water is additionally provided between step d) in reaction 4 and step e) in reaction and removal 5. In FIG. 7, proceeding from FIG. 3, a water electrolysis 8 is additionally provided, which provides hydrogen for step b) in reaction 2. FIGS. 3 to 7 here serve to illustrate individual aspects of the present process, although it is not ruled out that certain partial aspects may be combined with one another, in that, for example, the water electrolysis 8 from FIG. 7 is provided in the processes of FIGS. 3 to 6, etc.

Additionally disclosed, in a further aspect, is an apparatus for production of CO from $CO_2$, comprising:

- a first reactor for reaction of $CO_2$ with $H_2O$ and an amine of the formula $HNR_1R_2$ where $R_1$ and $R_2$ are the same or different and are selected from hydrogen and substituted and unsubstituted alkyl radicals having 1 to 20 carbon atoms to give a hydrogencarbonate of the formula $HNR_1R_2H^+$ $HCO_3^-$, which is designed to react $CO_2$ with $H_2O$ and an amine of the formula $HNR_1R_2$;
- a second reactor for reaction of the hydrogencarbonate of the formula $HNR_1R_2H^+$ $HCO_3^-$ with hydrogen to give a formate of the formula $HNR_1R_2H^+$ $HCO_2^-$, which is designed to react the hydrogencarbonate of the formula $HNR_1R_2H^+$ $HCO_3^-$ with hydrogen to give a formate of the formula $HNR_1R_2H^+$ $HCO_2^-$; further comprising
- a third reactor for decomposition of the formate of the formula $HNR_1R_2H^+$ $HCO_2^-$ to $H_2O$ and an amide of the formula $HNR_1R_2$, which is designed to decompose the formate of the formula $HNR_1R_2H^+$ $HCO_2^-$ to $H_2O$ and an amide of the formula $HNR_1R_2$, and
- a fourth reactor for decomposition of the amide of the formula $HNR_1R_2$ to CO and an amine of the formula $HNR_1R_2$, which is designed to decompose the amide of the formula $HNR_1R_2$ to CO and an amine of the formula $HNR_1R_2$; or
- a combined third reactor for decomposition of the formate of the formula $HNR_1R_2H^+$ $HCO_2^-$ to $H_2O$, CO and an amine of the formula $HNR_1R_2$, which is designed to decompose the formate of the formula $HNR_1R_2H^+$ $HCO_2^-$ to $H_2O$, CO and an amine of formula $HNR_1R_2$; further comprising
- a fifth reactor for at least partial reaction of the amine of the formula $HNR_1R_2$ produced in the combined third reactor or in the fourth reactor with a precipitation reagent, preferably with $CO_2$, for production of a mixture comprising CO, a precipitation product of the reaction of the amine of the formula $HNR_1R_2$ with the precipitation reagent and any unreacted amine of the formula $HNR_1R_2$, preferably a mixture comprising CO, a hydrogencarbonate of the formula $HNR_1R_2H^+$ $HCO_3^-$ and any unreacted amine of the formula $HNR_1R_2$, and for removal of the precipitation product of the reaction of the amine of the formula $HNR_1R_2$ with the precipitation reagent, preferably of the hydrogencarbonate of the formula $HNR_1R_2H^+$ $HCO_3^-$, to form a product comprising CO, with or without unreacted amine of the formula $HNR_1R_2$, wherein the fifth reactor is designed to at least partly react the amine of the formula $HNR_1R_2$ produced in the combined third reactor or in the fourth reactor with a precipitation reagent, preferably with $CO_2$, to produce a mixture comprising CO, a precipitation product of the reaction of the amine of the formula $HNR_1R_2$ with the precipitation reagent and any unreacted amine of the formula $HNR_1R_2$, preferably a mixture comprising CO, a hydrogencarbonate of the formula $HNR_1R_2H^+$ $HCO_3^-$ and any unreacted amine of the formula $HNR_1R_2$, and wherein the first reactor is additionally designed for removal of the precipitation product of the reaction of the amine of the formula $HNR_1R_2$ with the precipitation reagent, preferably the hydrogencarbonate of the formula $HNR_1R_2H^+$ $HCO_3^-$.

The apparatus of the invention can especially be used to perform the process of the invention. Correspondingly, particular remarks relating to the process of the invention are also applicable to the apparatus of the invention, and vice versa.

The first reactor, the second reactor, the combined third reactor, the third reactor, the fourth reactor and the fifth reactor are not particularly restricted, provided that they can contain the reactants converted and products produced therein. They may especially each be executed as described in connection with the process of the invention, i.e., for example, the first reactor as a crystallizer with a gas injection stirrer, packed column or bubble column, the second reactor as a slurry reactor, the third reactor as a catalyst-packed tubular reactor—where the catalyst is not particularly restricted—or as a shell and tube reactor, and/or the fourth reactor as an evaporation tank, etc. They may all be in spatial proximity, for example at a distance of less than 50 km, further preferably less than 20 km, even further preferably less than 10 km, from one another, or individual reactors may also be spatially further removed, i.e. be 50 km or more from one another. Suitable conduits for transportation of the respective compounds may be provided between the reactors, and or else other means of transportation such as transport vehicles, e.g. trucks, ships, etc., preference being given to conduits between the individual constituents of the apparatus in order to configure the apparatus in an integrated manner and to conduct the process in an integrated manner. The advantage in the present process is that there is no need to transport volatile gaseous compounds such as CO;

instead, they can be simply released at the desired site and before that can effectively be transported as a "precursor".

The fifth reactor may also comprise multiple reactor portions, i.e., for example, a reactor portion for precipitation and a reactor portion for removal. A preferred fifth reactor is a gas scrubber in which the solids are obtained at the bottom and a gas can escape at the top. Preference is given to operating a fifth reactor, especially a gas scrubber, in countercurrent, in which case preference is given to introducing a precipitation reagent, especially $CO_2$, from the bottom and the mixture comprising CO from the top.

In particular embodiments, the apparatus of the invention comprises a sixth reactor for separation of CO from the product comprising CO and unreacted amine of the formula $HNR_1R_2$, which is designed to separate CO from the product comprising CO and unreacted amine of the formula $HNR_1R_2$. This sixth reactor too is not particularly restricted and is executed, for example, as at least one coldbox.

When the hydrogencarbonate of the formula $HNR_1R_2H^+$ $HCO_3^-$ is formed in the fifth reactor, the apparatus of the invention in particular embodiments further comprises a first connecting device between the fifth reactor and the second reactor for supply of the hydrogencarbonate of the formula $HNR_1R_2H^+$ $HCO_3^-$ formed in the fifth reactor from the fifth reactor to the second reactor, which is designed to conduct hydrogencarbonate of the formula $HNR_1R_2H^+$ $HCO_3^-$ formed in the fifth reactor from the fifth reactor to the second reactor. The first connecting conduit is not particularly restricted. It may optionally also be combined with a second conduit between the first and second reactor, in which case a mixing device may also be provided in the second conduit, which is not particularly restricted.

In particular embodiments, the apparatus of the invention further comprises a separation apparatus disposed between the fourth reactor and the fifth reactor in flow direction and designed to at least partly separate a solvent and/or water from the CO and the amine of the formula $HNR_1R_2$. This forms a liquid stream and a gas product stream. The separation apparatus is not particularly restricted. Downstream of the separation apparatus, a liquid separation apparatus may also be provided in the liquid stream, which separates the liquid stream in such a way that solvent can be recycled to the first reactor, while a second liquid stream comprising any by-products formed in the above reactions, for example carbamates, can be sent to a device for further purification. A second connecting device may be included between the separation apparatuses for the liquid separation apparatus and the first reactor, which is designed to feed solvent separated off in the separation apparatus or the liquid separation apparatus to the first reactor. This second connecting conduit too is not particularly restricted.

In particular embodiments, the apparatus of the invention further comprises a first recycling device for the amine of the formula $HNR_1R_2$, which is designed to return an amine of the formula $HCONR_1R_2$ to the first reactor downstream of the fifth reactor or the sixth reactor in flow direction. This is not particularly restricted either, and may be a conduit, a means of transportation, etc.

In particular embodiment, the apparatus of the invention further comprises a water electrolysis device which is designed to electrolyze water and to provide the second reactor with hydrogen. This is likewise not particularly restricted, but is preferably in spatial proximity of the second reactor, preferably at a distance of less than 50 km, further preferably less than 20 km, even further preferably less than 10 km, in order to be able to guide hydrogen in a suitable manner, preferably in at least one conduit, to the second reactor.

In addition, it is also possible here to provide a suitable first thermal coupling method and a corresponding first thermal coupling apparatus which is designed to provide waste heat from the water electrolysis device to the third reactor and optionally to the fourth reactor or to the combined third reactor, for example a heat exchanger.

A first conduit that may lead to the first reactor is designed to supply $CO_2$ to the first reactor. A second conduit may be provided between the first and second reactor, a third conduit between the second and third reactor or the second and combined third reactor, a fourth conduit between the third and fourth reactor, a fifth conduit between the fourth and fifth reactor, and/or a sixth conduit between the fifth and sixth reactor, none of which are particularly restricted. A first heat exchanger may be provided in the second conduit, a second heat exchanger and/or a first thermal coupling device in the third conduit, a second thermal coupling device in the fourth conduit, one or more heat exchangers in the fifth conduit, which may also correspond to the first and/or second heat exchanger, additionally a product gas cooling apparatus in the fifth conduit, and/or a preheating device in the first recycle conduit, none of which are particularly restricted, and which can implement the cooling and/or preheating operations described in the process. The first and/or second thermal coupling device, in particular embodiments, is designed to provide waste heat from a downstream reaction of the CO, for example a Fischer-Tropsch synthesis, to the respective conduit. In particular embodiments, the apparatus of the invention comprises a device for further reaction of CO, especially a Fischer-Tropsch device, which is not particularly restricted and is designed to conduct a Fischer-Tropsch synthesis.

The first reactor may additionally have suitable the devices, for example for $CO_2$ and optionally $H_2O$, which are designed to feed $CO_2$ and optionally $H_2O$ to the first reactor.

Illustrative apparatuses of the invention are shown in schematic form in FIGS. 8 to 17, although it is not ruled out that individual apparatus constituents shown in particular figures may also be employed in apparatuses in other figures.

Figures 8, 9:
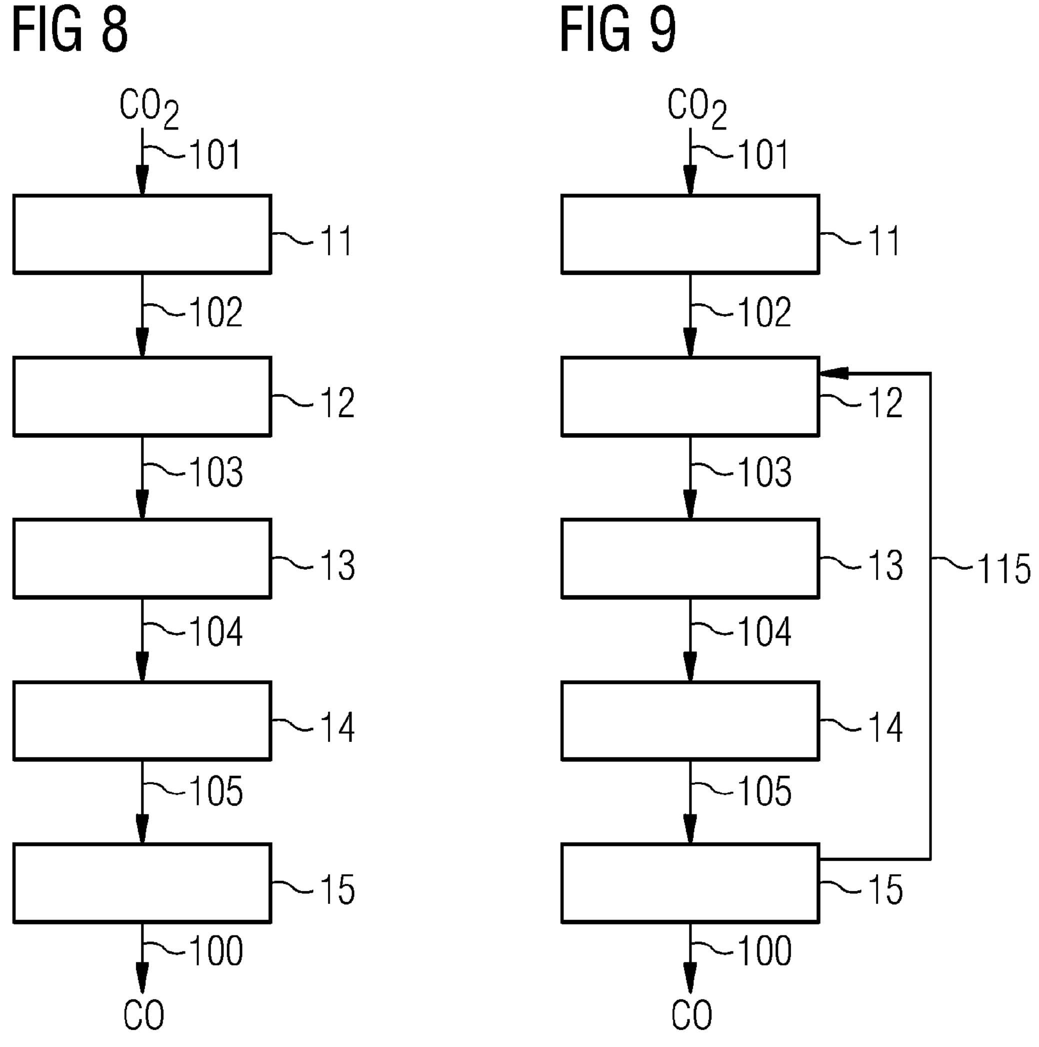

According to FIG. 8, $CO_2$ may be fed to the first reactor 11 via the first conduit 101, hydrogencarbonate produced therein may be fed to the second reactor 12 via the second conduit 102, formate produced therein may be fed to the third reactor 13 via the third conduit 103, amide produced therein may be fed to the fourth reactor 14 via the fourth conduit 104, CO and amine may be fed to the fifth reactor 15 via the fifth conduit 105, and CO be withdrawn via the CO product conduit 100.

The apparatus of FIG. 9 corresponds to that of FIG. 8, wherein $CO_2$ is used for precipitation in the fifth reactor 15 and hydrogencarbonate is fed to the second reactor 12 via the first connecting device 115.

Figures 10, 11:
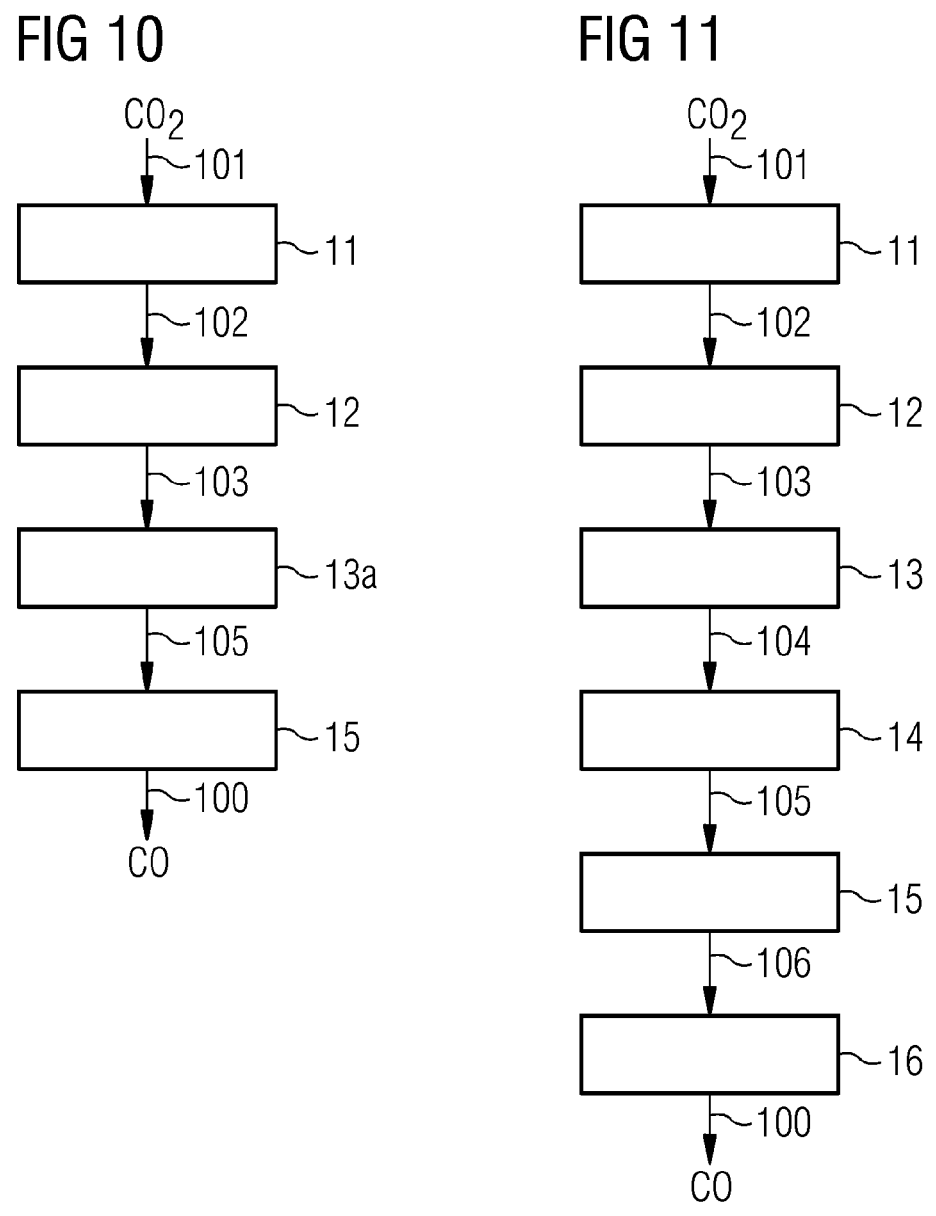

The apparatus of FIG. 10 is likewise based on that of FIG. 8, wherein the combined reactor **13*a* replaces the third reactor 13, the fourth conduit 104 and the fourth reactor 14**.

In the apparatus shown in FIG. 11, the fifth reactor 15 from FIG. 8 is followed by a sixth conduit 106 in which a product comprising CO and any unreacted amine is directed to the sixth reactor 16, before CO is removed therefrom via the CO product conduit 100.

Figures 12, 13:
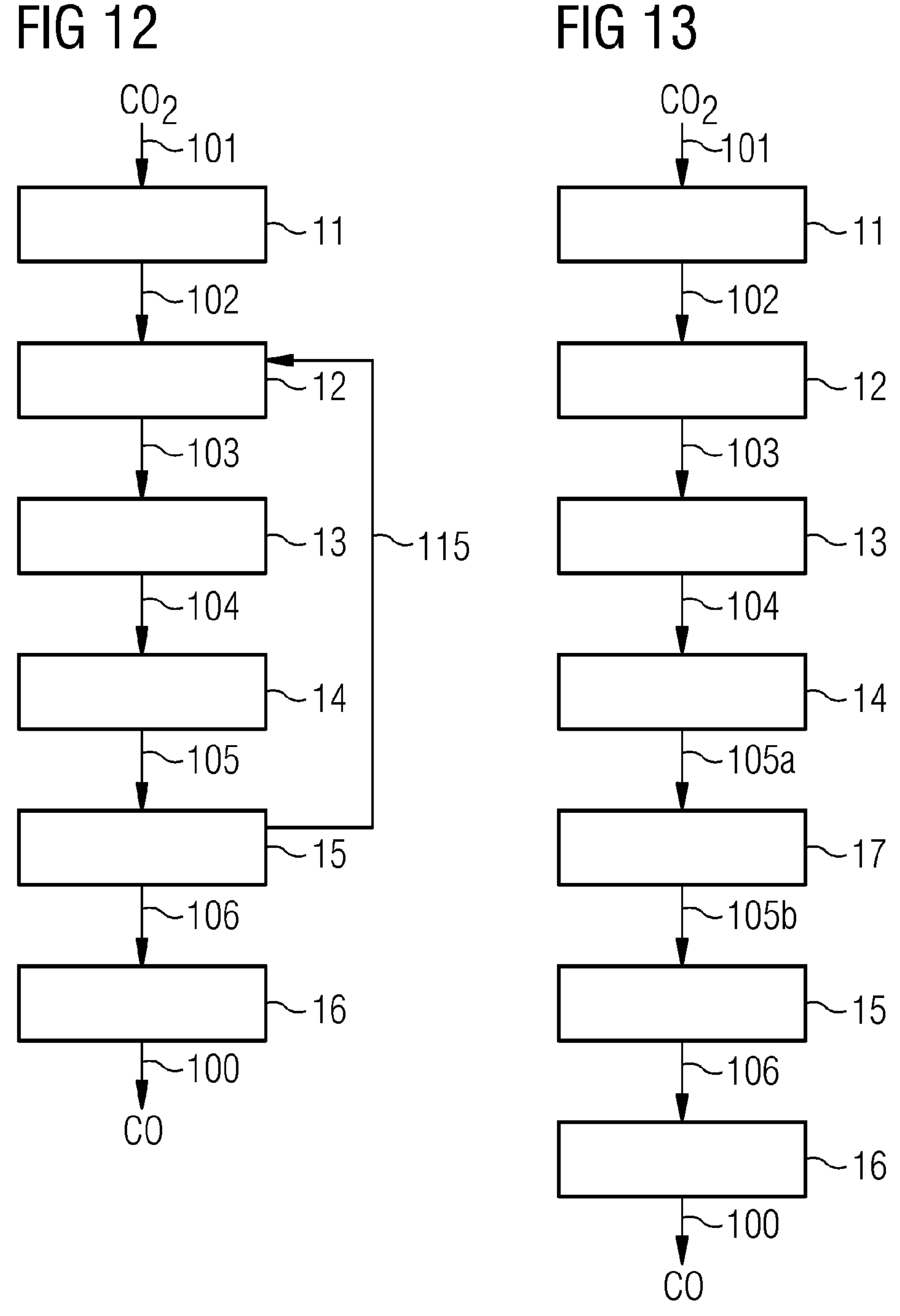

The apparatus shown in FIG. 12 corresponds to a combination of the apparatuses of FIGS. 9 and 11.

The apparatus of FIG. 13 is based on that FIG. 11, with a separation apparatus 17 provided between the fourth reactor 14 and the fifth reactor 15, wherein the fifth conduit is separated into a fifth part-conduit a, 105*a*, and a fifth part-conduit b, 105*b*, upstream or downstream of separation apparatus 17.

Figure 14:
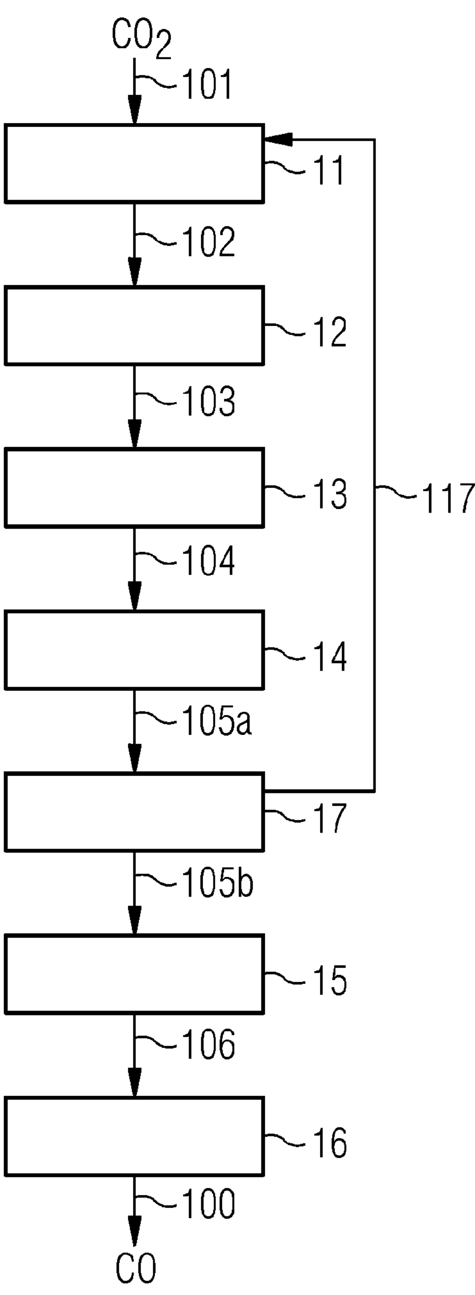

Based on the apparatus of FIG. 13, the apparatus of FIG. 14 additionally has a second connecting device 117 between the separation apparatus 17 and the first reactor 11.

Figure 15:
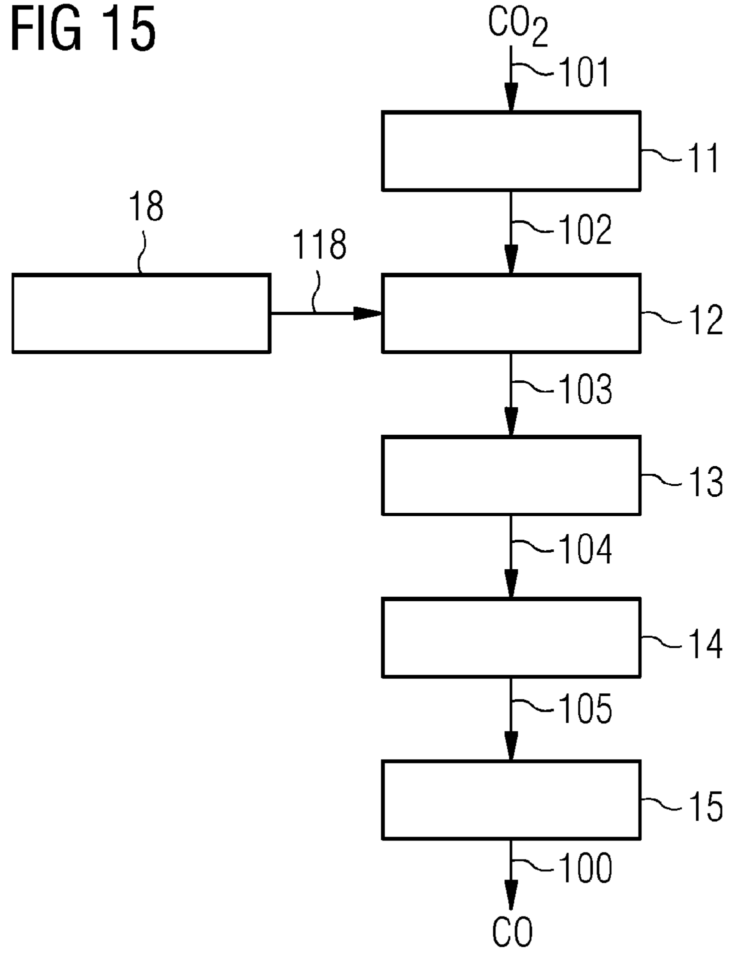

The apparatus of FIG. 15 is based in turn on the apparatus of FIG. 8, wherein hydrogen is fed to the second reactor 12 from the water electrolysis device 18 via a hydrogen conduit 118.

Figure 16:
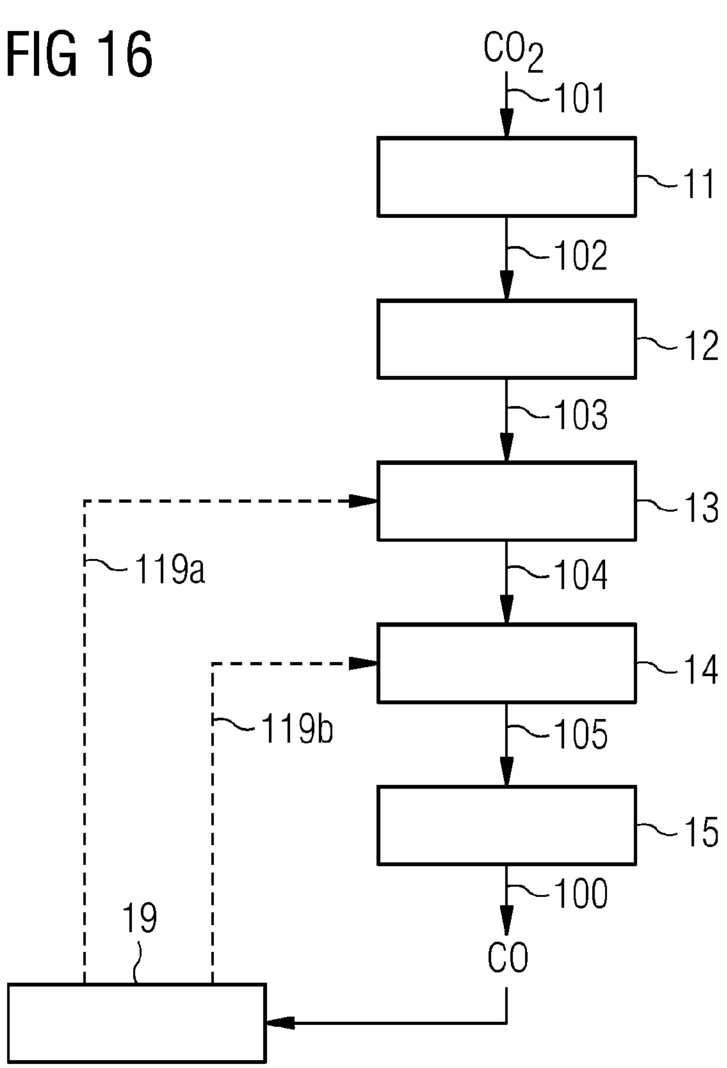

In the apparatus shown in FIG. 16, which is likewise based on the apparatus of FIG. 8, the CO is directed via the CO product conduit 100 to a Fischer-Tropsch device 19 as illustrative further processing apparatus for CO, which additionally effects thermal coupling to the third reactor 13 or fourth reactor 14 via a first thermal coupling device 119*a* and a second thermal coupling device 119*b*, wherein the thermal coupling could alternatively also be effected to the third conduit 103 or fourth conduit 104.

Figure 17:
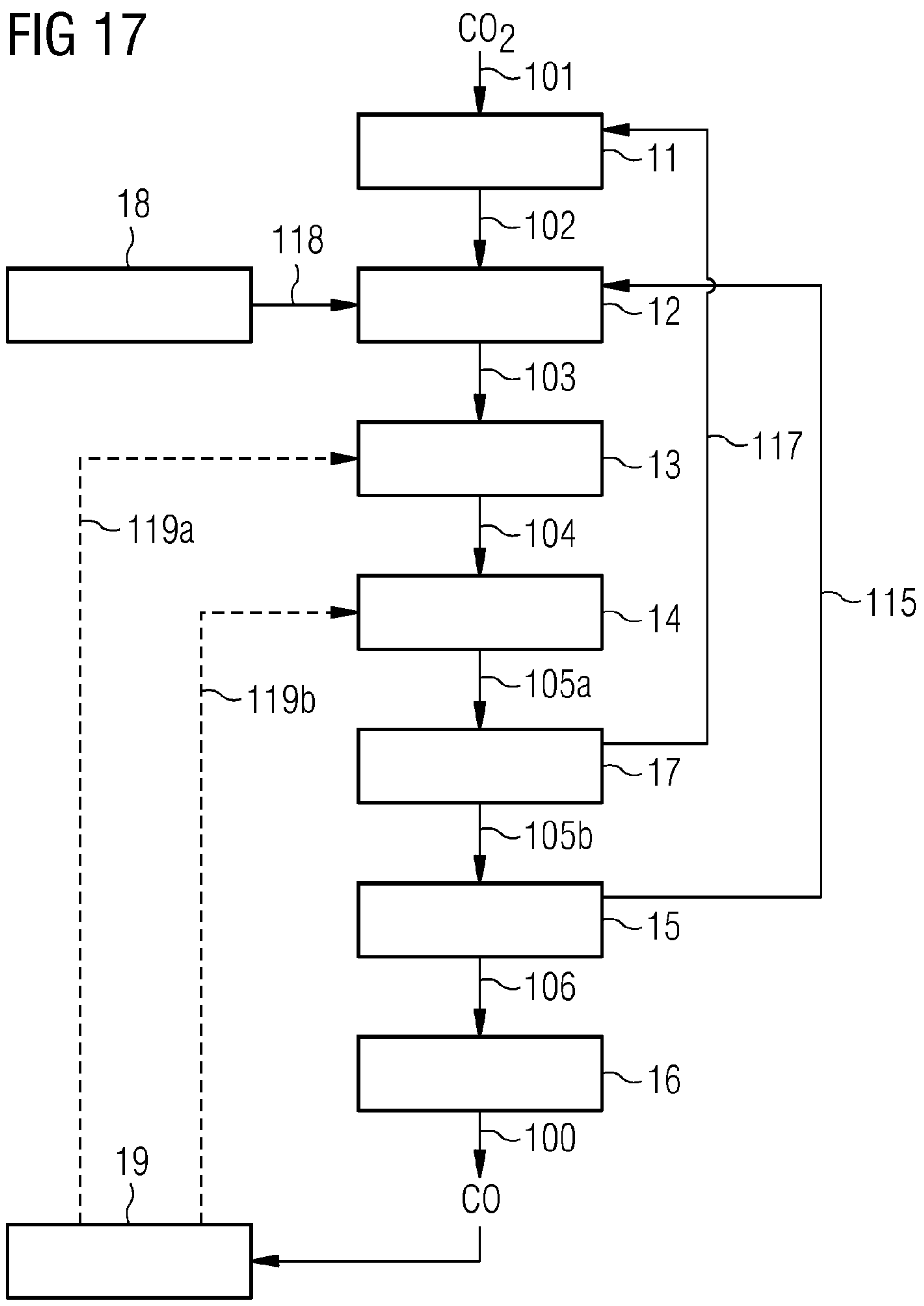

The apparatus of FIG. 17 that ultimately corresponds to a combination of the apparatuses of FIGS. 8, 9, 11 and 13 to 16. Here too, however, as in FIG. 10, it would be possible to replace the third reactor 13, the fourth conduit 104 and the fourth reactor 14 by a combined third reactor 13*a*.

The above embodiments, configurations and developments can, if viable, be combined with one another as desired. Further possible configurations, developments and implementations of the invention also include combinations of features of the invention that have been described above or are described hereinafter with reference to the working examples but have not been mentioned explicitly. More particularly, the person skilled in the art will also add individual aspects as improvements or additions to the respective base form of the present invention.

The invention is elucidated in detail hereinafter with reference to various examples thereof. However, the invention is not restricted to these examples.

Hereinafter, with reference to an example, the cycle of CO production is described in detail for theoretical energy assessment by comparison with methods currently used. By way of example, ammonia ($R_1=R_2=H$) is to be utilized here as the simplest amine.

The steps of the illustrative process are as follows:

Step a): Ammonium hydrogencarbonate is already being produced on a large industrial scale via the introduction of $CO_2$ into a concentrated ammonia solution at 35-40° C. About 100 000 t/y thereof were produced in 1997. Ammonium hydrogencarbonate precipitates out in the production, can be centrifuged off, and can be dried at 40° C. if required. Amine scrubbing operations are standard methods of scrubbing $CO_2$ out of flue gases, for example.

Step b): Dissolved ammonium hydrogencarbonate is hydrogenated with hydrogen to give ammonium formate, for example under pressure in an autoclave. For example, this can be effected at 20-40° C. and a hydrogen pressure of 2.75 MPa, which can achieve a high yield and high conversion, as described by way of example in Su et al.; (2015), "Highly Efficient Hydrogen Storage System Based on Ammonium Bicarbonate/Formate Redox Equilibrium over Palladium Nanocatalysts"; ChemSusChem 2015, 8, 813-816.

Step c): The main use of ammonium formate in industry is the provision of formamide by the decomposition of the formate. Ammonium formate is heated here to more than 170° C. This decomposes it to formamide and water. A possible reaction of ammonia formate can be seen in U.S. Pat. No. 1,582,675: Production of formamide from ammonium formate, in which pure formamide is extracted.

Step d): Formamide decomposes at temperatures over and above 180° C. without catalyst further to give CO and ammonia, with only measurable traces of HCN. HCN can be produced at higher temperatures. Only at higher temperatures between 600 and 1000° C. does the decomposition to HCN and $H_2O$ become dominant.

In a subsequent step, the ammonia obtained is dissolved again in water and partly precipitated with $CO_2$ and additionally finally removed and hence separated from CO. This can result in a high proportion of CO (optimally pure CO) in the product gas, and it is possible to establish a closed ammonia circuit through recycling to step a).

In addition, the water released from the hydrogenation and/or from the decomposition to give formamide can be fed back to the cycle in step a) and/or in the water electrolysis.

This process can solve various problems, for example in the provision of the energy, which avoids an energy efficiency problem. As shown schematically in FIG. 1, for example, there is only a direct requirement for electrical energy in the production of hydrogen.

The supply of heat in the decomposition (step c) and d)) can be provided via thermal coupling of other chemical productions. One example is Fischer-Tropsch synthesis (Arge process). The products formed from CO and $H_2$ are paraffins/olefins, which can in turn be processed further to give fuels.

The process is conducted at about 220 to 240° C. In thermodynamic terms, the reaction is strongly exothermic at −158 kJ/mol (per —$CH_2$— unit), corresponding to about 3.5 $GJ/t_{CO}$.

$$CO+H_2 \rightarrow —CH_2—+H_2O, \Delta H_R=-158 \text{ kJ/mol}$$

In thermodynamic terms, the decomposition steps require—by way of example for ammonium formate, which decomposes to formamide and ultimately to CO—only 94.6 and 19.4 kJ/mol respectively.

$$[NH_4][COOH]\ (s) \rightarrow HCONH_2\ (l)+H_2O\ (l), \Delta H_R=19.35 \text{ kJ/mol}$$

$$HCONH_2\ (l) \rightarrow CO\ (g)+NH_3\ (g), \Delta H_R=94.57 \text{ kJ/mol}$$

In total, in thermodynamic terms, the decomposition of ammonium formate to CO requires only about 114 $kJ/mol_{CO}$. The energy required can therefore be covered by the waste heat from the Fischer-Tropsch process, which is 158 $kJ/mol_{CO}$. This is additionally obtained already at the required temperature level.

This is indeed still the case with a division of the production steps, as detailed, for example, in FIG. 2. Here too, the waste heat from the Fischer-Tropsch process is sufficient to assure the decomposition of the formamide (−158 kJ/mol of waste heat versus 94.6 kJ/mol of energy required).

In the first step, the energy for the decomposition of ammonium formate is taken from the waste heat from the hydrogen electrolyzer. The typical energy efficiency is 90% or less (M. Schalenbach, G. Tjarks, M. Carmo, W. Lueke, M. Mueller, and D. Stolten, *J. Electrochem. Soc.,* 163 (2016) F3197). With a theoretical energy of 285.83 kJ/mol, 31.76 kJ/mol of waste heat would thus be obtained.

$$H_2O\ (l) \rightarrow \tfrac{1}{2}O_2\ (g)+H_2\ (g), \Delta H_R=285.83 \text{ kJ/mol}$$

The decomposition of ammonium formate, by contrast, requires only 19.35 kJ/mol and can be provided by the waste heat from the water electrolyzer.

Both in the case of production of CO at one site and in the case of division of the sites, it is thus possible to use waste heat from the steps in order to make the production of CO more energy-efficient.

In total, therefore, only the energy for the production of hydrogen is provided electrically, while the energies required for the endothermic decomposition processes of formate and formamide are covered by waste heat from the Fischer-Tropsch process and/or the water electrolysis. This makes the production chain particularly energy-efficient.

By way of illustration, this process shall be compared with direct $CO_2$ electrolysis and the Sabatier process:

The Sabatier process comprises 3 steps:

1. Water electrolysis:

$$2H_2O\ (l) \rightarrow O_2\ (g) + 2H_2\ (g), \Delta H_R = 571.66\ \text{kJ/mol}$$

2. Sabatier:

$$4H_2\ (g) + CO_2\ (g) \rightarrow CH_4\ (g) + 2H_2O\ (l),$$

$$\Delta H_R = -255.75\ \text{kJ/mol}$$

3. Partial oxidation:

$$CH_4\ (g) + \tfrac{1}{2}O_2\ (g) \rightarrow CO + 2H_2\ (g), \Delta H_R = -32.93\ \text{kJ/mol}$$

The overall resultant reaction equation is again the same:

$$CO_2 \rightarrow CO + \tfrac{1}{2}O_2, \Delta H_R = 282.98\ \text{kJ/mol (rounding error)}$$

It should be noted here that, however, for the production of 1 mol of CO, 2 mol of $H_2$ has to be produced by the electrolysis. Therefore, electrical energy expenditure, in thermodynamic terms, is 571.66 kJ/mol, and with inclusion of the efficiency of about 90% is about 635 kJ/mol.

In a $CO_2$ electrolysis, by contrast, the following half-cell reactions occur (see, for example, Liu et al.; (2018), "$CO_2$ Electrolysis to CO and $O_2$ at High Selectivity, Stability and Efficiency Using Sustainion Membranes"; Journal of Electrochemical Society, 165 (15) J3371-J3377 (2018)):

1. Cathode:

$$CO_2\ (g) + H_2O + 2e^- \rightarrow CO + 2OH^-, \Delta H_R = 108.75\ \text{kJ/mol}$$

2. Anode:

$$H_2O \rightarrow 2H^+ + 2e^-, \Delta H_R = 285.83\ \text{kJ/mol}$$

Neutralization:

$$2H^+ + 2OH^- \rightarrow 2\ H_2O, \Delta H_R = -111.61\ \text{kJ/mol}$$

The overall equation that follows therefrom is as already shown above.

A problem here is that electrical energy has to be expended in the cell reaction in order to split $H_2O$ to hydroxide. This already intrinsically reduces energy efficiency. It is thus already necessary here, in third terms, to expend 394.58 kJ/mol (rather than the theoretical 282.98 kJ/mol). With an efficiency of about 50% (by comparison with the desired reaction; see Liu et al.; (2018), "$CO_2$ Electrolysis to CO and $O_2$ at High Selectivity, Stability and Efficiency Using Sustainion Membranes"; Journal of Electrochemical Society, 165 (15) J3371-J3377 (2018)), the need is then even about 566 kJ/mol. But this energy expenditure is still lower than the thermochemical route via the Sabatier process.

The advantages of the process presented here are also apparent by virtue of the possibility of thermal integration. The only electrical energy expenditure here is in the hydrogen electrolysis, which requires 285.83 kJ/mol in thermodynamic terms. The further thermal energies may be compensated for by skillful combination with other chemical productions in which waste heat is obtained. Therefore, the electrical energy expenditure at 90% electrolyzer efficiency, for example for ammonia as amine, is 317.6 kJ/mol and is thus much more efficient than the other routes.

The division of the process into multiple steps, and the benefit of storage and transport of amide, e.g. formamide, makes it possible to produce formate or amide at a $CO_2$ source, and only to obtain CO from the thermal decomposition at the desired site of further processing. In the further processing of the CO to give fuels or further higher-value chemicals, for example, the waste heat is obtained at the same site, and is used for the decomposition of the formamide, meaning that the decomposition and further processing sequences also match in terms of location.

It is advantageous here when the amine obtained here is liquid at ambient temperature or can be dissolved in water. In this way, simple return transport is assured. On account of the ease of transport, the processes of $CO_2$ absorption, hydrogenation and release may also be locally separated without having to transport critical gases.

Example 2

By way of further illustration of the process, an optimized process simulation is conducted with ammonia as absorbent.

Figure 18:
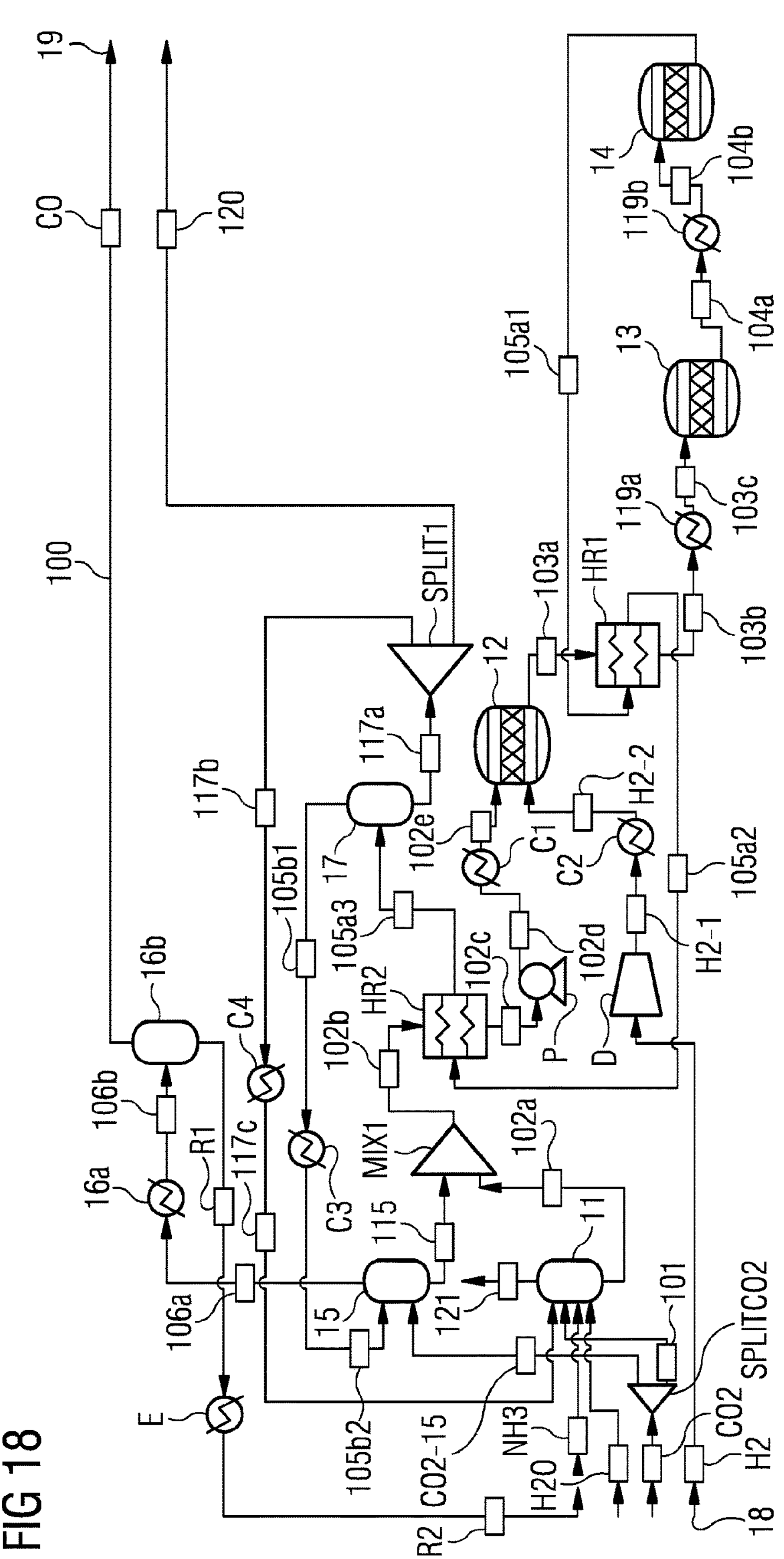
FIG. 18 additionally shows a schematic of an apparatus of an example of the present invention.

FIG. 18 shows the process simulation of the process with individual components in AspenPlus V11.0 with steps a) to f) and further steps.

The system consisting of the components shown in table 2 was calculated by the ENRTL-RK physical property method. Pure gas phase systems were calculated by the Soave-Redlich-Kwong (SRK) method (methods present in the integrated databases). The flow diagram consists of process steps a) to f), and of the thermal integration of the product stream and of the Fischer-Tropsch plant (119*a*, 119*b*). The purification of the carbon monoxide in a coldbox is likewise part of the flow diagram and hence part of the energy balance.

TABLE 2

Components and relevant streams in the process

| Symbol (*1) | Description/purpose | Symbol (*2) | Description/purpose |
|---|---|---|---|
| H2O | Water supply | 11 (r) | First reactor: Ammonia scrubbing (Step a) |
| NH3 | Ammonia supply | MIX1 (p) | Mixing device: Liquid phase recycling |
| R1, R2 | Recycled ammonia via first recycling device | HR2 (p) | First heat exchanger: Thermal integration of product stream |
| CO2 | $CO_2$ supply | P (p) | Pump: Conveying to reaction pressure before step b) |

TABLE 2-continued

| Components and relevant streams in the process | | | |
|---|---|---|---|
| Symbol (*1) | Description/purpose | Symbol (*2) | Description/purpose |
| H2 | Hydrogen supply | D (p) | Compressor: Compression of the hydrogen to reaction pressure |
| CO | CO product gas stream | C1, C2 (p) | Cooling devices: Cooling of the streams to reaction temperature |
| 120 | Purge stream for avoidance of accumulation and for partial removal of the water formed in step c) | 12 (r) | Second reactor: Heterogeneously catalyzed hydrogenation of the ammonium carbonate (Step b) |
| 121 | Gas recycling into step a) | HR1 (p) | Second heat exchanger: Thermal integration of product stream |
| | | 119a (p) | First thermal coupling device: Thermal integration of Fischer-Tropsch plant |
| | | 13 (r) | Third reactor: Formate decomposition (step c) |
| | | 119b (p) | Second thermal coupling device: Thermal integration of Fischer-Tropsch plant |
| | | 14 (r) | Fourth reactor: Decomposition of the formate (Step d) |
| | | 17 (t) | Separation apparatus: Product stream separation of liquid-gas phase |
| | | C3 (p) | Product gas cooling apparatus: Cooling of the gas stream to increase the hydrogencarbonate yield |
| | | SPLIT1 (t) | Liquid separation apparatus: Removal of the water formed in the hydrogenation and a portion of the by-products and recycling of the water for step a) |
| | | SPLITCO2 | CO2 splitter for separation of the feed of $CO_2$ to the first reactor 11 and fifth reactor 15 |
| | | C4 (p) | Liquid stream cooling apparatus: Cooling of the liquid stream to increase the hydrogencarbonate yield |
| | | 15 (t) | Fifth reactor: Purification of the CO by removal of ammonium hydrogencarbonate again |
| | | 16a, 16b (t) | Coldbox: Removal of the ammonia |
| | | E (p) | Preheating device: Preheating of the recycled ammonia |
| | | 18 | Water electrolysis device |
| | | 19 | Fischer-Tropsch device |

(*1)Relevant streams
(*2)Reaction (r) and separation (t) apparatuses and periphery (p)

The construction gives rise to the following conduits with corresponding streams:

- 101: first conduit with $CO_2$
- 102*a*, 102*b*, 102*d*, 102*d*, 102*e*: second conduit with ammonium hydrogencarbonate
- 103*a*, 103*b*, 103*c*: third conduit with ammonium formate
- 104*a*, 104*b*: fourth conduit with formamide
- 105*a*1, 105*a*2, 105*a*3: fifth part-conduit a with CO, ammonia and water before removal of water
- 105*b*1, 105*b*2: fifth part-conduit b with CO, ammonia and residual water after removal of water (gas product stream)
- 117*a*, 117*b*, 117*c*: second connecting conduit with recycled water (liquid stream)
- 106*a*, 106*b*: sixth conduit with CO and ammonia
- 100: CO product conduit comprising essentially CO or solely CO
- H2-1, H2-2: feed conduits for hydrogen
- CO2-15: $CO_2$ feed conduit to the fifth reactor 15
- 115: first connecting conduit with recycled ammonium hydrogencarbonate The product comprising CO 106*a* contains a relatively high proportion of ammonia, which is separated off for the further use of the CO product in the process chain. This is accomplished via a cryogenic process in coldboxes 16*a,b*. The ammonia that has been cooled down is first preheated by means of the heat exchanger E and fed in turn to step a) in the first reactor 11), which ensures a closed ammonia circuit.

For simulation reasons, the first recycling device R2 and the NH3 stream are not connected to one another.

In step a), the water content is minimized (25.6% by weight of ammonia, 36.2% by weight of $CO_2$, balance: water), in order to minimize the energy expenditure of the downstream processes. Otherwise, step a) corresponds in principle to a conventional amine scrubbing, although the water content and $CO_2$ content in the first step a) differs in the process example calculated from the amine scrubbing. In conventional amine scrubbing, the $CO_2$ and ammonia loadings are much lower, and hence the water content is greater.

In the case of the calculated process example, a slightly superstoichiometric ratio ($NH_3/H_2O$=1.4) avoids conveying of pure solids.

In the case of the low-water plant design calculated here, the product mixture is composed of 5.6 $m^3$/day of an aqueous phase and 17.3 $m^3$/day of a solid phase (mainly ammonium hydrogencarbonate). This requires a reaction apparatus suitable for a slurry-like and abrasive product mixture; it is therefore possible to use continuous crystallizers with gas injection stirrer as the first reactor 11.

The resultant slurrylike mixture is suitably conveyed by rotating displacement pumps, such as eccentric screw pumps, as pump P.

Through the use of other amines, for example those listed in table 1, it is possible to increase selectivity further for the hydrogencarbonate.

For step b), in apparatus terms, the process step is conducted in a slurry reactor with a finely divided palladium catalyst. The enthalpy of reaction of the exothermic hydrogenation is −21.359 kJ/mol. The removal of heat from the reactor which is thus necessary on a larger scale can be utilized for the preheating of the next step c).

The process conditions for the hydrogenation in the slurry reactor for the simulation are in the region of 60° C. and 27.5 bar. In addition to the electrochemical compression of the hydrogen, this therefore additionally has to be compressed and then brought to the reaction temperature of the 2nd step. The energy expenditure needed for this purpose for the isentropic compression in compressor D, with an efficiency of 72% and the required cooling (C2), is 0.1 MW in total.

The task of conveying of the multiphase reactant mixture at reaction pressure with pump O is assumed, by way of example, by an eccentric screw pump with subsequent cooling (C1). On account of the incompressible character of the slurrylike reaction mixture, the compression is associated with a low energy expenditure.

The water obtained in process step b) can be utilized for heating of the entire process as internal heat carrier medium by backward integration (process streams from **105*a*1), and is removed only later on in the process (SPLIT1), in order to avoid accumulation of by-products. A purification of the purge stream 120** contaminated with by-products enables virtually complete recovery of the ammonia used in the process. In addition, the purified water can be fed to the electrolyzer either in the form of process water ($H_2O$ stream) or optionally after removal of the ionic components.

Reaction step c) in the third reactor 13 is highly endothermic, for example with an enthalpy of reaction of 94.6 kJ/mol, and it can therefore be assumed that, as well as the preheating to an operating temperature of about 140° C. in or after step b), the reactor itself constitutes a major heatsink. These sinks can be compensated for by the backward integration of the product stream (preheating with second heat exchanger HR1) and the integration of the waste heat from the Fischer-Tropsch process via the first thermal coupling device **119*a***.

Reaction step c) proceeds in the liquid phase, but it is possible to drive out the gases dissolved in step a) in water in the heating of the reaction mixture. In addition, a large portion of the water involved in the process is additionally present in the gas phase at a reaction pressure of 1 bar. For that reason, a possible reactor configuration is a catalyst-packed tubular reactor or a shell and tube reactor.

In order to increase the conversion, ammonia may additionally be added to the gas phase.

Alternatively, the water formed in the previous reaction step or the absorbent from step a) can be separated off before the preheating of the reaction mixture by distillation with utilization of the waste heat from the Fischer-Tropsch process. This enables smaller mass flow rates in steps c) and d) and the subsequent purification sequence, but makes it more difficult to convey the reaction mixture which is partly in solid form.

For step d), the gas phase was analyzed in first decomposition experiments on formamide. The measurement setup was first flushed here with nitrogen. Formamide was heated to 220° C. until there was regular bubble formation. Ammonia formed and any HCN were removed. The results for the other gas products can be seen in table 3 below.

TABLE 3

| Gas analysis results for step d) [% by vol.] | |
|---|---|
| CO | 83.0% |
| $H_2$ | 0.06% |
| $CO_2$ | 0.21% |
| $N_2$ | 11.1% |
| $O_2$ | 0.33% |
| Total | 94.7% |
| CO:$H_2$ | 1376 |

It should be noted here that the residual nitrogen comes from the purging of the apparatus. Possible gaseous by-products, which were also analyzed in Schwab, G.-M. (1950), Über den Zerfall von Formamid. Z. Anorg. Chem., 262: 41-48. doi:10.1002/zaac.19502620107, are barely detectable. Hydrogen and $CO_2$ are present only in very small amounts. The main product of the decomposition is CO.

On account of the low enthalpy of reaction of 19.35 kJ/mol, it can be assumed that a small input of heat is necessary. This is dominated by the preheating to 180° C. as mentioned. In this case too, on account of the temperature level, integration of the waste heat from the Fischer-Tropsch process with the second thermal coupling device **119*b* is possible. For this process, which is uncatalyzed here, it is possible to utilize an evaporation tank as the fourth reactor 14. This makes it possible for the $NH_3$ and CO product gases and the steam to flow out. By means of the heat transfer and the backward integration in the second heat exchanger HR1, the hot steam-product gas mixture is cooled down to 84° C. The condensation of the high-boiling constituents give rises to a reduced pressure, which can assume the task of conveying the vapor mixture from the fourth reactor 14** to the second heat exchanger HR1.

The cooling and the associated phase separation allows the phase consisting mainly of water to be separated off in the separation apparatus 17. In order to control the water content in the downstream purification step e) in the fifth reactor 15, the product stream is cooled merely from 84° C. to 68° C.

The gas product stream **105*b*2 including the product gas then goes into the fifth reactor 15, in which case the ammonia is scrubbed out with $CO_2$. The result is a purified product stream containing a relatively low proportion of $NH_3$. The $NH_3$ remaining in the product stream is separated off by the cryogenic step f) in coldboxes 16*a,b* which precedes the Fischer-Tropsch synthesis, and is heated to 30° C. by means of a preheating device in order to be reused in step a). This closes the ammonia circuit of the process. If the purge stream 120** is purified and fed back in as processed water stream, virtually complete regeneration of the ammonia is possible.

In relation to FIG. 18, step e) in the fifth reactor 15 likewise constitutes a kind of ammonia scrubbing, in this case with the aim of enriching the product gas with CO and precipitating out $NH_3$ as far as possible. This enables lower energy expenditure for the downstream selective CO purification in coldboxes 16_a,b_ before the Fischer-Tropsch synthesis. Step e) is conducted here at a temperature level of 30-60° C. and a pressure level of 1 bar, since low temperatures lead to a higher yield of ammonium carbonate and hence a more efficient separation process.

The energy balance of the process is considered hereinafter; only the apparatuses shown in FIG. 18 are cited here. The potentially recirculatable streams 120 and R2 are not taken into account. The third stream 120 can be concentrated by distillation with the aid of the waste heat from the Fischer-Tropsch process, which allows salts having a low water content to be recycled within the process. This step, for simulation reasons, is not included in FIG. 18 of the process simulation.

The process simulation was conducted for a hydrogen mass flow rate of 1.3 t/day, corresponding to an electrolysis output of 13.1 MW. The production output of CO in the process is 15.1 t/day with a purity of 94.1% (5.8% hydrogen, 555 ppm of $NH_3$). The input streams for the process, in addition to the $CO_2$ mentioned and the hydrogen stream, are 9 t/day of water and 6.1 t/day of ammonia.

The starting point used for step a) is an equilibrium, and the product streams are calculated correspondingly. The conversion in reaction step b) is estimated based on the literature (see above) to be 80% based on ammonium hydrogencarbonate. In step c), a conversion of 95% based on formate is assumed. For reaction step d), on account of the decomposition reaction in the evaporation tank, full conversion is assumed. 3.7 t/day of the ammonia used can be recycled directly in gaseous form.

Additionally present in the recycled ammonia stream R2 from coldboxes 16_a,b_ after the pre-heating are 1.2 t/day of ammonium ions and 3.9 t/day of carbamate ions. Converted to the molar amount of ammonia recycled, it is thus possible to recycle 82% of the ammonia utilized. 18% is accordingly present in the purge stream 120, which can likewise be purified and fed to the water electrolysis as process water.

The relevant components with the calculated energy requirement thereof are listed in table 4 below.

TABLE 4

Energy requirement of the apparatus according to FIG. 18 as per simulation

| | Power required [MW] | Integratability |
|---|---|---|
| First reactor 11 | −0.52 | Cooling output |
| Pump P | 0.05 | Conveying output |
| First cooling device C1 | −0.05 | Cooling output |
| Compressor D | 0.05 | Compression output |
| Second cooling device C2 | −0.05 | Cooling output |
| Second reactor 12 | 0.13 | Heat output, integratable with Fischer-Tropsch |
| First thermal coupling device 119a | 0.48 | Heat output, integratable with Fischer-Tropsch |
| Third reactor 13 | 0.61 | Heat output, integratable with Fischer-Tropsch |
| Second thermal coupling device 119b | 0.22 | Heat output, integratable with Fischer-Tropsch |
| Fourth reactor 14 | 0.29 | Heat output, integratable with Fischer-Tropsch |
| Separation apparatus 17 | −0.41 | Cooling output |
| Third cooling device C3 | −0.46 | Cooling output |
| Fifth reactor 15 | −0.28 | Cooling output |
| Coldbox 16a | −0.21 | Cooling output |
| Preheating device E | 0.08 | Cooling output |

TABLE 4-continued

Energy requirement of the apparatus according to FIG. 18 as per simulation

| | Power required [MW] | Integratability |
|---|---|---|
| Total energy requirement | 3.86 | Heating output |
| Energy requirement with Fischer-Tropsch integration | 2.14 | |

It should be noted that the coldbox 16_b_ was included in the simulation merely for removal with negligible energy expenditure.

The integratable energy requirement via the Fischer-Tropsch plant is 1.72 MW. The net energy requirement of the process of 2.14 MW is offset by the energy demand of the hydrogen at 13.1 MW. This results in an extra expenditure of 16.3% in order to provide 15.1 t/day of CO on a 13.1 MW scale.

The yield of CO based on $CO_2$ used in the process described is 89%. The remaining $CO_2$ is separated out via the purge stream 120 in the form of chemically or physically result species. Purification of this stream is possible, as already mentioned.

Example 3

For process optimization, further decomposition experiments according to step d) are conducted as an example 2 with formamide, with the following changes in the experimental setup:

60 g of formamide was heated in autoclaves, and the product gas was purged with acid in order to remove $NH_3$. Thereafter, the product gas was analyzed in a gas chromatograph (GC). This achieves a higher product gas flow rate and faster establishment of the equilibrium state.

Experiment 1, Temperature: 220° C.

After opening a valve and after establishing equilibrium in the product stream, the latter was analyzed by GC.

The results for the remaining gases are shown in table 5.

TABLE 5

Gas analysis results for step d) [% by vol.] in experiment 1

| | |
|---|---|
| CO | 94.6% |
| H2 | 2.53% |
| CO2 | 0.44% |
| N2 | 1.43% |
| O2 | 1.03% |
| Total | 100.03% |
| CO:H2 | 37.4 |

Experiment 2, Temperature: 200° C.

The buildup of pressure in the apparatus was measured. For this purpose, an outlet valve was closed and pressure was measured at regular intervals.

The results in this regard are shown in table 6.

TABLE 6

Experimental results from experiment 2

| Time t [h] | Pressure p [bar] |
|---|---|
| 0 | 0.9 |
| 0.583 | 1.3 |
| 1 | 1.6 |
| 1.25 | 1.7 |

TABLE 6-continued

| Experimental results from experiment 2 | |
|---|---|
| Time t [h] | Pressure p [bar] |
| 2.5 | 2.5 |
| 3.083 | 2.8 |
| 5.25 | 3.7 |
| 5.833 | 4 |
| 17.083 | 7.4 |
| 17.416 | 7.9 |
| 18.5 | 9 |
| 19.083 | 9.9 |
| 19.416 | 10.3 |
| 19.75 | 10.8 |
| 20.75 | 12 |
| 21.25 | 12.6 |

Figure 21:
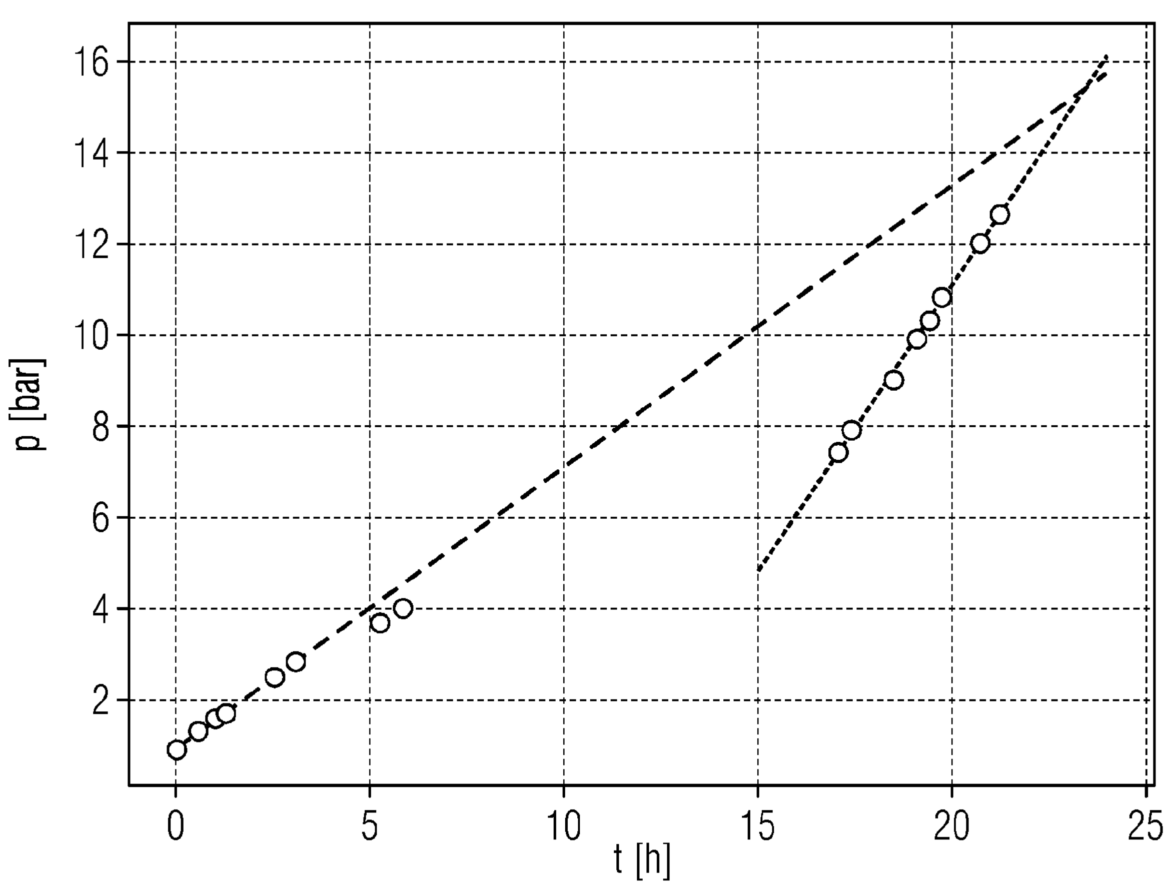
FIG. 21 shows results of experiment 2 of example 3.

For better illustration, the results are also shown in FIG. 21, in which pressure p is plotted against time t.

The result was two different slopes of the pressure. In addition, the product mixture was discharged at about 13 bar. At a residual pressure of about 7 bar (discharge leads to purging of the dead volume), the product gas was measured. The result is shown in table 7.

TABLE 7

| Gas analysis results for step d) [% by vol.] in experiment 2 | |
|---|---|
| CO | 45.2% |
| H2 | 39.6% |
| CO2 | 6.1% |
| N2 | 0.8% |
| O2 | 8.1% |
| CH4, C2H4, C2H6 | traces (0.1%, 0.05%, 0.03%) |
| Total | 99.8% |
| CO:H2 | 1.14 |

A comparison of experiments 1 and 2 makes it clear that decarbonylation is the primary decomposition reaction in the region of low pressures (<7 bar), whereas the formamide is dehydrated at higher pressures (>12 bar).

The present process is based on the combination of already industrialized/industrializable, but chemically entirely independently utilized production steps.

Step a): The amine scrubbing is utilized in order to separate usually acidic gases, e.g. $CO_2$ or hydrogen sulfide, from gas mixtures. This is used, for example, in natural gas and biogas processing ($CO_2$ removal from methane), direct air capture processes, refining and petrochemical plants.

Step b): Hydrogenation is widely used industrially. In the food industry, vegetable oils are processed (C double bonds are reduced); in petrochemistry, alkenes and aromatics are hydrogenated to give saturated alkanes.

Steps c) and d): Thermal decomposition is used in a wide variety of different chemical molecules, for example in the production of CaO. In addition, the thermal decomposition of dimethylammonium formate has been utilized for production of DMF (dimethylformamide). This is used as a wide-ranging solvent.

Step e) Purification of CO via a kind of "inverse" amine scrubbing

By comparison with other processes for CO production, the following advantages arise:

All steps are scalable in terms of volume.

Only commercial processes are used; for this purpose, only commercialized materials are used.

The product may be pure CO; in the case of $CO_2$ electrolysis, it is typically a mixture of $CO_2$ and CO, and in the Sabatier process with subsequent partial oxidation a mixture of CO and $H_2$.

Energy efficiency can be distinctly increased by thermal integration. The energy needed is already obtained here at the correct temperature level.

The subdivision into the individual steps makes it possible to conduct steps in the best possible industrial environments.

The storage and transport of amide, e.g. formamide, is additionally less hazardous than that of CO, and the CO density transported is higher and simpler.

In addition, in the case of decomposition of the amide, for example of formamide, there is no need to take note of a reaction equilibrium.

REFERENCE SYMBOLS

1 reaction of step a)
2 reaction of step b)
3 reaction of step c)
3*a* transport of the amide of the formula $HCONR_1R_2$
4 reaction of step d)
5 reaction and removal in step e)
6 purification in step f)
7 removal step for solvent and/or water
8 intermediate water electrolysis step
9 recycling of amine of the formula $HNR_1R_2$
10 subsequent process, e.g. Fischer-Tropsch synthesis
11 first reactor
11*a* gas injection stirrer
11*b* heat exchanger
11*c* feed for a heat transfer medium
11*d* drain for a heat transfer medium
12 second reactor
12*a* slurry reactor
12*b* outlet for gas
13 third reactor
13*a* combined third reactor
14 fourth reactor
15 fifth reactor
16 sixth reactor
16*a* coldbox
16*b* coldbox
17 separation apparatus
18 water electrolysis device
19 Fischer-Tropsch device
100 CO product conduit
101 first conduit
102 second conduit
102*a* part of the second conduit in FIG. 18
102*b* part of the second conduit in FIG. 18
102*c* part of the second conduit in FIG. 18
102*d* part of the second conduit in FIG. 18
102*e* part of the second conduit in FIG. 18
103 third conduit
103*a* part of the third conduit in FIG. 18
103*b* part of the third conduit in FIG. 18
103*c* part of the third conduit in FIG. 18
104 fourth conduit
104*a* part of the fourth conduit in FIG. 18
104*b* part of the fourth conduit in FIG. 18
105 fifth conduit
105*a* fifth part-conduit a upstream of the separation apparatus
105*a*1 part of the fifth part-conduit a in FIG. 18
105*a*2 part of the fifth part-conduit a in FIG. 18
105*a*3 part of the fifth part-conduit a in FIG. 18

105*b* fifth part-conduit b downstream of the separation apparatus
105*b*1 part of the fifth part-conduit b in FIG. 18
105*b*2 part of the fifth part-conduit b in FIG. 18
106 sixth conduit
106*a* part of the sixth conduit in FIG. 18
106*b* part of the sixth conduit in FIG. 18
115 first connecting device
117 second connecting device
117*a* part of the second connecting device in FIG. 18
117*b* part of the second connecting device in FIG. 18
117*c* part of the second connecting device in FIG. 18
118 hydrogen conduit
119*a* first thermal coupling device
119*b* second thermal coupling device
120 purge stream
121 gas recycling into step a) in FIG. 18
A production section of the production of the of the formula $HCONR_1R_2$
B production section of the formation and further use of CO
C1 cooling device
C2 cooling device
C3 product gas cooling apparatus
C4 liquid stream cooling apparatus
CO carbon monoxide
CO2 carbon dioxide
CO2-15 $CO_2$ feed conduit to the fifth reactor in FIG. 18
D compressor
E preheating device
H2 hydrogen
H2-1 feed conduit for hydrogen in FIG. 18
H2-2 feed conduit for hydrogen in FIG. 18
H2a conduit for hydrogen
H2O water
HR1 second heat exchanger
HR2 first heat exchanger
MIX1 mixing device
NH3 ammonia
p pressure
P pump
R1 first recycling device
R2 first recycling device
S $CO_2$ point source
S1 tank
S23 tank
SPLIT1 liquid separation apparatus
SPLITCO2 CO2 splitter
t time

The invention claimed is:

1. A process for producing CO from CO2, comprising:

a) reacting $CO_2$ with water and an amine of the formula $HNR_1R_2$ where $R_1$ and $R_2$ are the same or different and are selected from hydrogen and substituted and unsubstituted alkyl radicals having 1 to 20 carbon atoms to give a hydrogencarbonate of the formula $HNR_1R_2H^+ HCO_3^-$;

b) reacting the hydrogencarbonate of the formula $HNR_1R_2H^+ HCO_3^-$ with hydrogen to give a formate of the formula $HNR_1R_2H^+ HCO_2^-$;

c) decomposing the formate of the formula $HNR_1R_2H^+ HCO_2^-$ to give an amide of the formula $HCONR_1R_2$ and $H_2O$;

d) decomposing the amide of the formula $HCONR_1R_2$ to give CO and an amine of the formula $HNR_1R_2$, giving rise to a mixture comprising the need of the formula $HNR_1R_2$ and CO; and e) at least partly reacting the amine of the formula $HNR_1R_2$ in the mixture comprising the amine of the formula $HNR_1R_2$ and CO with a precipitation reagent for production of a mixture comprising CO and a precipitation product of the reaction of the amine of the formula $HNR_1R_2$ with the precipitation reagent, with or without unreacted amine of the formula $HNR_1R_2$, and separating off the precipitation product of the reaction of the amine of the formula $HNR_1R_2$ with the precipitation reagent, giving rise to a product comprising CO, with or without unreacted amine of the formula $HNR_1R_2$.

2. The process as claimed in claim 1,
wherein the product comprising CO, with or without unreacted amine of the formula $HNR_1R_2$, comprises the unreacted amine of the formula $HNR_1R_2$,
further comprising a step f) of separating the CO from the product comprising CO and unreacted amine of the formula $HNR_1R_2$.

3. The process as claimed in claim 1,
wherein the precipitation reagent in step e) is $CO_2$, wherein the hydrogencarbonate of the formula $HNR_1R_2H^+ HCO_3-$ which is formed in step e) is sent to step b).

4. The process as claimed in claim 1,
wherein steps a) to d) are effected in a solvent.

5. The process as claimed in claim 4,
wherein the solvent is at least partly separated off before step e).

6. The process as claimed in claim 5,
wherein solvent separated off before step e) and/or water from the reaction in step b) and/or c) is at least partly fed back to step a) and/or, in the case of water, optionally to a water electrolysis.

7. The process as claimed in claim 1,
wherein $R_1$ and $R_2$ are hydrogen.

8. The process as claimed in claim 1,
wherein the hydrogen used in step b) is produced by a water electrolysis.

9. The process as claimed in claim 1,
wherein energy is provided in step c) and/or d) by a further reaction of CO.

10. The process as claimed in claim 1,
wherein the precipitation reagent comprises $CO_2$.

11. The process as claimed in claim 1,
wherein the mixture comprises CO and a hydrogencarbonate of the formula $HNR_1R_2H^+ HCO_3^-$, with or without unreacted amine of the formula HNR1R2.

12. The process as claimed in claim 1,
wherein the precipitation product is the hydrogencarbonate of the formula $HNR_1R_2H^+ HCO_3^-$.

13. The process as claimed in claim 4,
wherein the solvent is at least partly separated off between step d) and step e).

14. The process as claimed in claim 1,
wherein energy is provided in step c) and/or d) by a further reaction of CO in a Fischer-Tropsch synthesis.

* * * * *